Oct. 5, 1965  G. F. BORRMANN  3,209,544
MARINE STRUCTURE

Filed May 27, 1963  8 Sheets-Sheet 1

INVENTOR
GERALD F. BORRMANN
BY Frank E. Johnston
Charles J. Gireau
ATTORNEYS

Oct. 5, 1965    G. F. BORRMANN    3,209,544
MARINE STRUCTURE
Filed May 27, 1963    8 Sheets-Sheet 2

INVENTOR
GERALD F. BORRMANN
BY *Frank E. Johnston*
*Charles J. Gilcrease*
ATTORNEYS Oct. 5, 1965 G. F. BORRMANN 3,209,544
MARINE STRUCTURE
Filed May 27, 1963 8 Sheets-Sheet 3
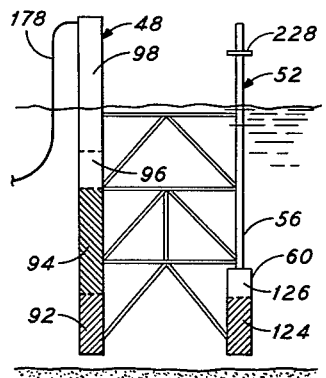
FIG. 5
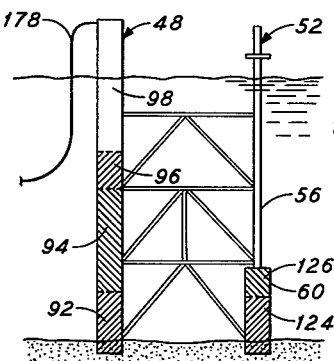
FIG. 6
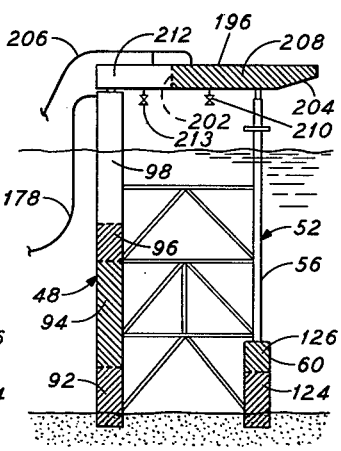
FIG. 7
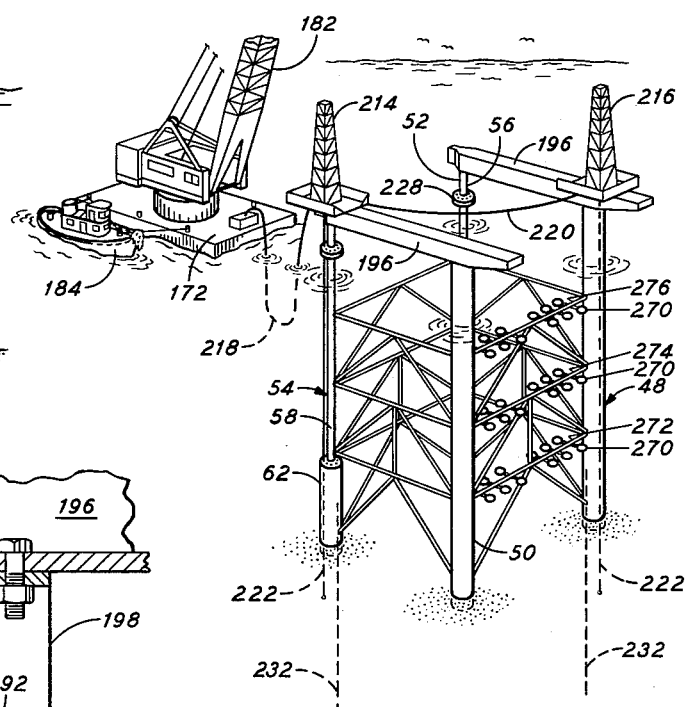
FIG. 8
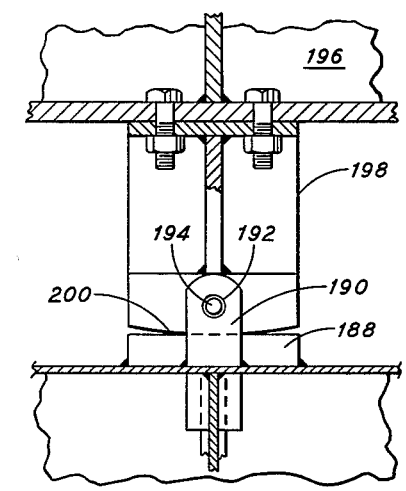
FIG. 9
FIG. 10
INVENTOR
GERALD F. BORRMANN
BY
ATTORNEYS INVENTOR
GERALD F. BORRMANN
BY *Frank E. Johnston*
*Charles J. Gibeau*
ATTORNEYS INVENTOR
GERALD F. BORRMANN
BY *Frank E. Johnston*
*Charles J. Gibeau*
ATTORNEYS Oct. 5, 1965   G. F. BORRMANN   3,209,544
MARINE STRUCTURE
Filed May 27, 1963   8 Sheets-Sheet 7

INVENTOR
GERALD F. BORRMANN
BY P.E. Johnston
Charles J. Gibeau
ATTORNEYS

Oct. 5, 1965  G. F. BORRMANN  3,209,544
MARINE STRUCTURE
Filed May 27, 1963  8 Sheets-Sheet 8

INVENTOR
GERALD F. BORRMANN
BY
ATTORNEYS

United States Patent Office 3,209,544
Patented Oct. 5, 1965

3,209,544
MARINE STRUCTURE
Gerald F. Borrmann, Lafayette, Calif., assignor to California Research Corporation, San Francisco, Calif., a corporation of Delaware
Filed May 27, 1963, Ser. No. 296,148
14 Claims. (Cl. 61—46.5)

This invention relates to a marine structure, and more particularly to an offshore platform and this application is a continuation-in-part application 843,727 filed October 1, 1959 and now abandoned. It is directed primarily to a supporting structure for an offshore platform, which structure preferably is fabricated on land and then is floated to an offshore site where it is seated on the submerged land surface to extend upwardly through the water and support a working platform above the surface.

In has been recognized heretofore that the erection of an offshore platform can be facilitated if major components of the structure are constructed in a shipyard and thence transported to an offshore site where the components are assembled together. Such components may include long, columnar structures to support deepwater platforms. In the latter instance the technique has been used of towing the columnar structure in a horizontal position to the offshore site, where it is then upended to a vertical position and set on the underwater bottom. When such a structure is formed of several interconnected columns and manipulated in the water as a unit, the mass and dimensions of the assembly are such that it has the potential of moving suddenly with great and destructive force if the stages of maneuvering it through the water and tilting it to an upright position are not kept under adequate control.

It is an object of this invention to provide a novel support structure for an offshore platform and to provide such a structure as will be stable in the water against excessive roll and pitch while it is being towed on the surface of the water in a horizontal position and also while it is disposed in various stages while upending it to a vertical position.

Another object of this invention is to provide a support structure which has integrated columnar legs and in which the component parts of the structure are constructed and distributed in the assemblage in a manner to provide positive control over the attitude of the structure in various predetermined stages of rotation from a horizontal to a vertical position in the water when it is erected at an offshore site.

Still another object of this invention is to provide a support structure which has interconnected elongated columnar legs and in which the masses and buoyancies of the component parts are distributed in a particular manner to provide an assemblage of inherent stability against excessive rolling and pitching and which can be maneuvered in the water and erected at an offshore site without generating potentially destructive forces resulting from uncontrolled rolling or pitching of it.

A further object of this invention is to provide a support structure for supporting an offshore platform, which structure is made up of columnar platform-supporting members; and in which a principal column member includes casing elements through which a well bore is drilled, and in which the casing elements are constructed as a functional part of the column member to provide the latter with the necessary load-carrying ability while permitting a reduction in the weight of the structure.

Other objects of this invention will become apparent as the description of it proceeds hereinafter in conjunction with the accompanying drawings which form part of this application.

The objects of this invention are achieved in a platform support structure which has a plurality of columnar support members affixed together in spaced relationship by cross bracing, and which is constructed with some of the support members adjacent to each other made with less weight than the remainder of the support members to thereby place the center of gravity of the structure to one side of its geometric longitudinal axis. The support members of greater weight are also constructed as principal controllably buoyant pontoons upon which the structure is floated horizontally in the water to the offshore site. In this condition, therefore, the center of gravity of the structure is displaced closer to the surface of the water and the stability of the structure against rolling and pitching is increased.

The support members of less weight are constructed throughout their upper longitudinal portion to have less buoyancy in the water than the corresponding upper portion of the heavier support members and therefore will have a lesser buoyancy effect on the assembly when it is rotated to a vertical position in the water with the upper portions of the support members partially submerged. This distribution of buoyancy increases the stability of the assembled structure against rolling and pitching as it asumes an upright position in the water.

The lower portions of the lighter support members are each constructed as a controllably buoyant pontoon section of the column and together they function as spaced apart stabilizing pontoons which prevent excessive roll and pitch of the assemblage as the structure is being tilted to an upright position. The lighter mass of the upper portion of the column acting on these pontoon sections increases their effectiveness for this purpose. The pontoon portions of the lighter column members cause the center of gravity of the assembly to be lowered as these portions are flooded with water and further stabilize the structure against rolling, pitching, and uncontrolled movements as it is being erected. They also provide means to control the angle of inclination as it is being tilted in the water and they cooperate with the principal pontoon members to hold the assemblage stable in steady-state positions against potentially damaging uncontrolled movements or gyrations as the erection procedure is being carried out. Thus by the asymmetrical distribution of mass which is built into the assemblage and the differential buoyancy effects of its interconnected members, the controlled stability of the structure in its various floating positions during towing and erection is accomplished.

In one exemplary embodiment of this invention, the objects are achieved in a marine support structure which has four columnar legs disposed approximately at the four corners of a rectangular drilling platform. The columnar legs, all of which are not identical, are constructed and secured together in a manner to place the center of gravity of the assemblage below the metacenter for positions of the structure between the horizontal and various attitudes inclined to the vertical, and to place the center of buoyancy above the center of gravity when the structure is being maneuvered and upended in the water. Two adjacent legs of the structure are formed as cylindrical pontoons of sufficient buoyant capacity to float the assemblage at the surface of the water. The interiors of these pontoons are divided into separate chambers which can be flooded with water or blown out with air to change to buoyancy of particular chambers and thereby change the angle of the assemblage with respect to the vertical. The other two legs of the support structure are constructed as columns of appreciably less external diameter and weight than the first-mentioned pontoon legs and have a relatively much smaller buoyant capacity throughout the major portion of their length. The bottom portions of these second legs are formed as controllably buoyant pontoon footings of sufficient buoyant capacity to assist in controlling and sustaining the angular position of the assemblage as it is rotated to a vertical position in the water. The pontoon footings of the second columnar legs function also in the manner of spaced-apart, stabilizing pontoons which prevent undue rolling or pitching of the assemblage in various inclined attitudes as its position is transposed from the horizontal to the vertical.

After the assemblage is rotated to a vertical position, the principal pontoon legs and the pontoon footings of the second legs are further flooded with water until the assemblage sinks into contact with the submerged land. The assemblage is then leveled and the support structure secured to the submerged land by piles which are placed through guide casings which are an integral part of the internal structure in the principal pontoon legs and of the pontoon footings of the second legs.

The support structure of this invention may be recovered for use at another offshore site by cutting off the piles securing it to the underwater bottom and reversing the lowering procedure to float the structure again at the surface of the water in a horizontal position. If the distance to the new site is not great, the structure may be partially refloated while maintaining a vertical position after cutting loose from the bottom, and moved in the vertical position to the new site for subsequent lowering into contact with the underwater bottom.

In the drawings:

FIG. 1 is a side elevational view, partly in section, of an offshore drilling platform embodying a support structure made in accordane with this invention.

FIGS. 2-6, inclusive, are schematic representations of the steps involved in towing the support structure of FIG. 1 to an offshore drilling site and setting it vertically on the submerged land surface.

FIGS. 7 and 8 are schematic representations of a leveling operation for the support structure.

FIG. 9 is a view in side elevation, and partly in section, of a detail of a detachable connection between the top of a column member and a girder mounted on it.

FIG. 10 illustrates schematically the manner in which the support structure is secured by piles to the submerged land.

Figures 21, 22:
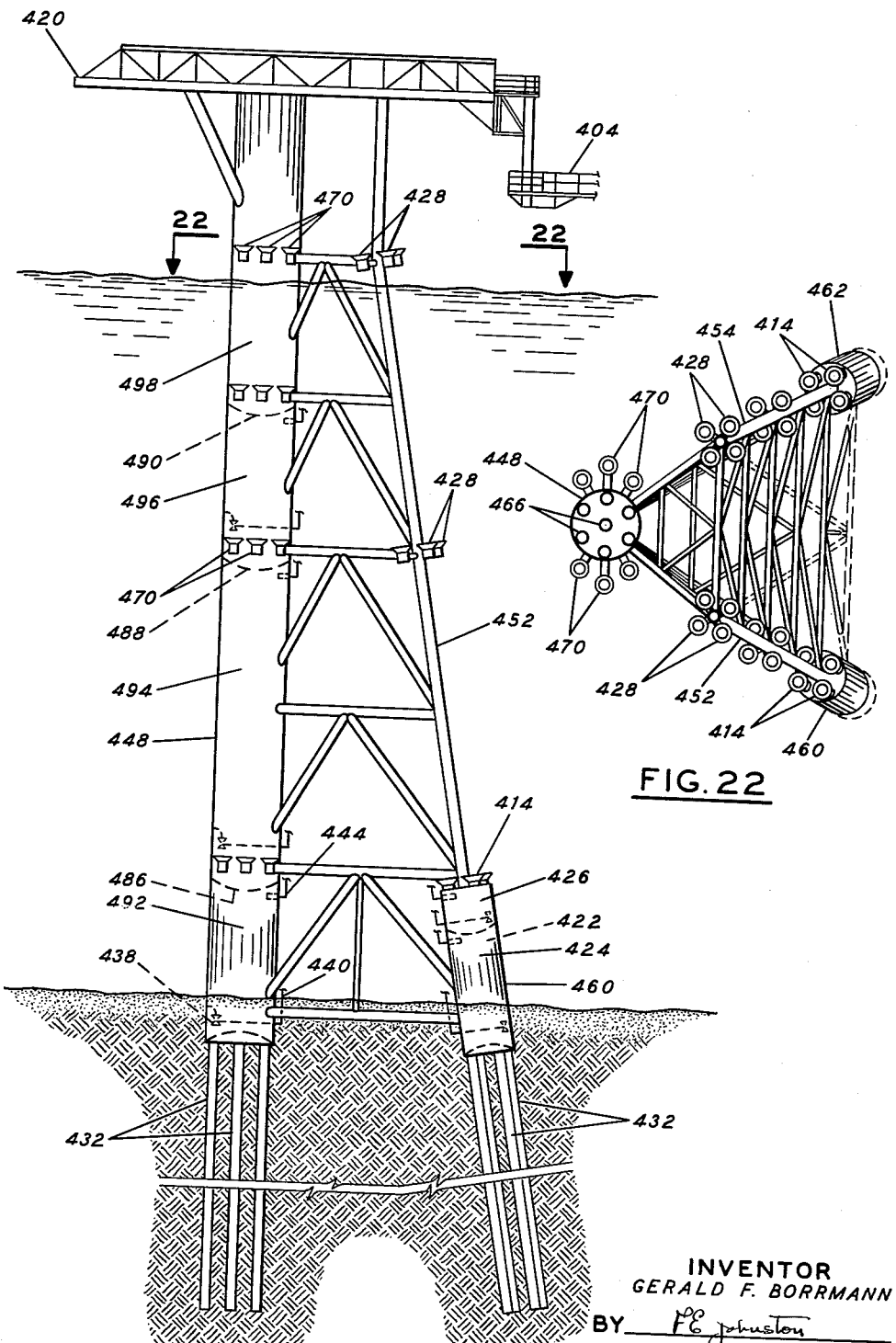
FIG. 21 is a side elevational view, partly in section, of a modification of an installed offshore drilling and production platform embodying a support structure made in accordance with this invention.
FIG. 22 is a plan view taken along the line 22—22 of FIG. 21.

FIGS. 23-28, inclusive, are schematic representations of the various positions assumed by the support structure of FIG. 21 as it is maneuvered from a horizontal to a vertical floating position.

Figure 1:
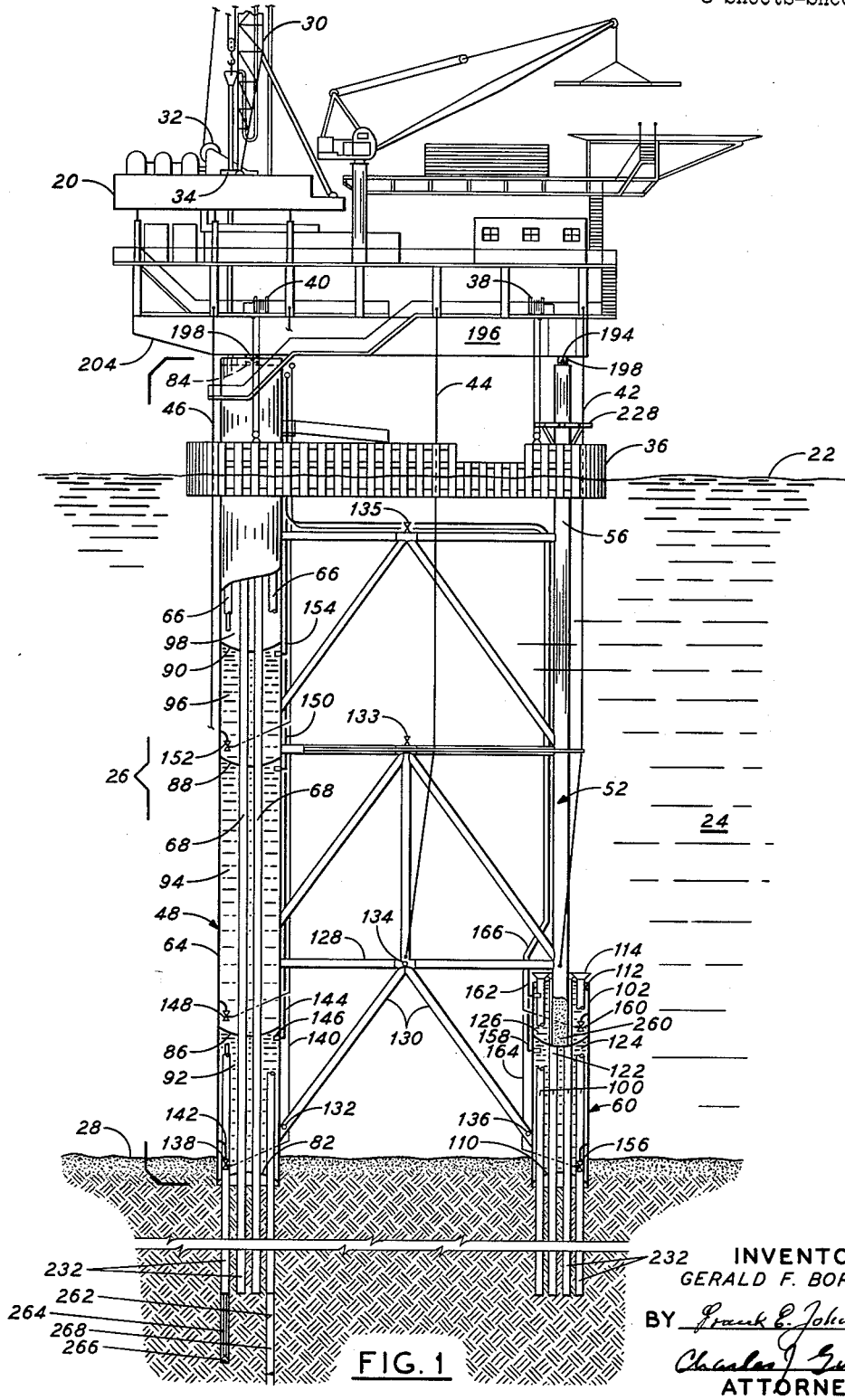

Referring to FIG. 1 of the drawings, there is illustrated a drilling platform 20 supported above the surface 22 of a body of water 24 by a support structure 26 which extends downwardly and is secured to the submerged land 28. The drilling platform contains a derrick 30, draw works 32, rotary table 34, pipe racking and handling equipment, storage, circulating and conditioning equipment for the drilling mud, and the other equipment and appurtenances known to the art which are necessary for the performance of a rotary drilling operation. The support structure is designed for use in conjunction with a movable derrick and rotary table to enable a multiplicity of wells to be drilled from one platform setting in a manner to be explained more fully hereinafter.

A boat fender 36 is supported from the finished platform by winches, as 38 and 40, which enable the elevation of the fender to be changed in accordance with the tidal changes in elevation of the water surface, and by tensile cables, as 42, 44 and 46, which prevent sharp impacts on the fender from being imposed directly on the support structure.

Figure 2:
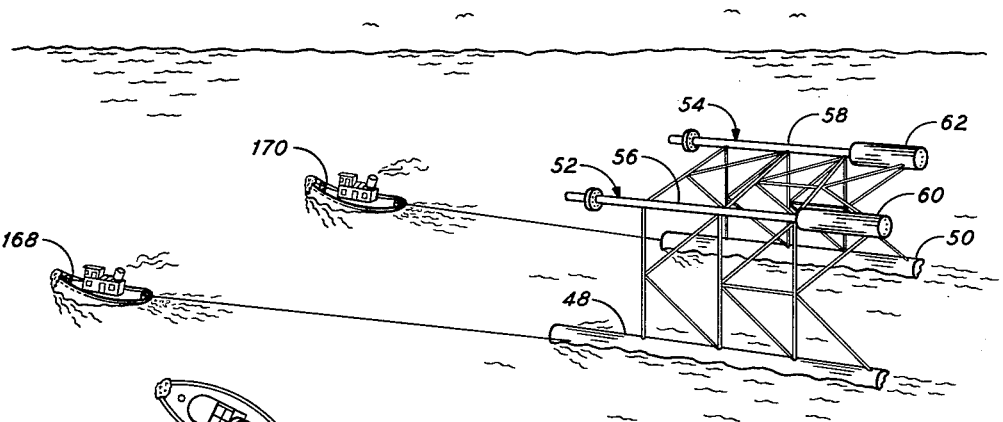
Figure 3:
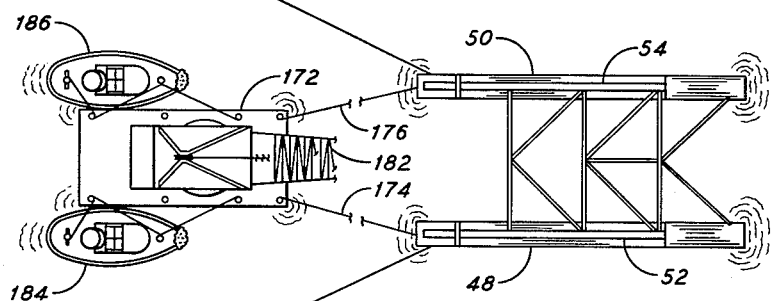

Referring now to FIGS. 2 and 10 in conjunction with FIG. 1, this embodiment of the support structure includes four interconnected columnar legs disposed to support a substantially rectangular drilling platform. Two adjacent legs, 48 and 50, are formed as uniform cylinders from the top to the bottom thereof and are closed at their top and bottom ends by airtight closures. These legs, in addition to their platform-supporting function, form principal pontoons upon which the assembled support strucutre 26 can be floated horizontally on the surface of the water.

The other two legs, 52 and 54, of the support structure are formed throughout the major portion of their length as column 56 and 58, respectively, of appreciably less external diameter and mass-per-unit length than the columns 48 and 50. The lowermost portion of each of columns 52 and 54 is formed as a respective pontoon section 60 and 62, of sufficient buoyant capacity to control the angular movement of the assembled structure and to stabilize it against roll and pitch as it is rotated from a horizontal to a vertical position in the water, and to act in conjunction with the buoyancy of the principal pontoon column members 48 and 50 to hold the assembled structure in various predetermined attitudes inclined to the vertical and finally in a vertical position as it is lowered into contact with submerged land, in a manner to be explained more fully hereinafter.

Although not limited to deep water use, the advantages of a support structure made in accordance with this invention becomes more apparent in deep water installations, particularly if the platform site is in open waters where sudden winds or storms can cause the waves to build up until a condition is reached where ordinary construction procedures become hazardous or impractical. The chances of meeting such condtions increase with the time required for construction at the offshore site. A structure made in accordance with this invention has a distinct advantage in the speed with which it can be set upright and secured to the underwater bottom in safe condition against storm forces.

The structure to which the invention is directed is designed to be maneuvered in the water, set on bottom, leveled, and secured to the submerged land by operations performed at the surface of the water. The assembled support structure must be capable of being manipulated in the water without creating through its movement any forces destructive to itself and without being susceptible to having induced in it destructive forces or instabilities of position caused by the periodically recurring forces at the surface of the water. When it is considered that a support strucutre of the form illustrated in FIG. 1 for use in a water depth of about 175 feet will have column members over 210 feet in length with the principal pontoon columns approximately 16 feet in diameter and spaced 75 feet apart, while the secondary slimmer column members are spaced rectangularly 80 feet from the pontoon column members, the structure presents a massive assemblage the weight of which is capable of generating large forces through its movements. The present invention provides means for reducing the over-all mass of such an assemblage while retaining ample strength to support a permanently installed offshore drilling platform and for distributing the masses of the component parts in a particular manner to achieve an inherent stability of the assemblage as it is maneuvered from a horizontal to a vertical position in the water.

Figure 15:
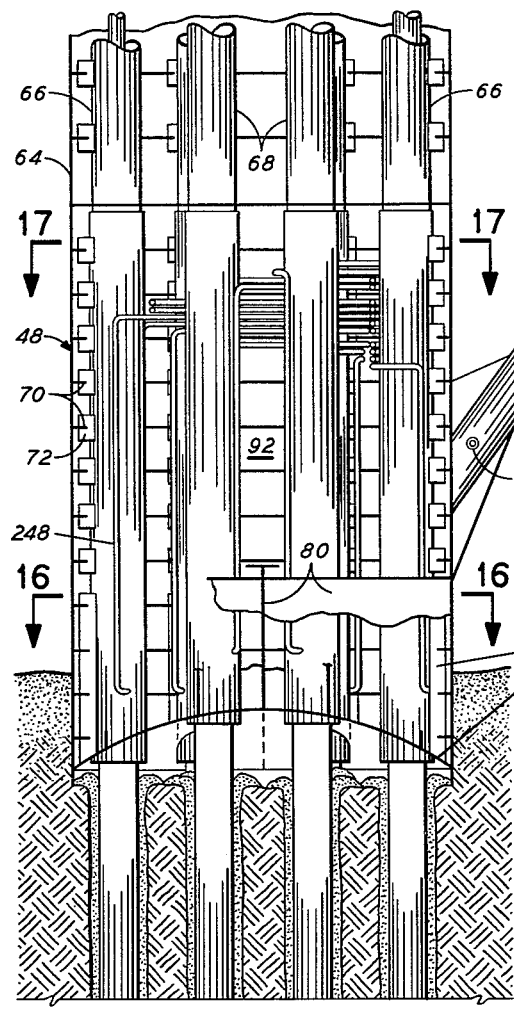
FIG. 15 is a view in elevation and partly in section of the lower portion of one of the principal cylindrical pontoon column members of the support structure and illustrates in more detail the construction of this member, the manner in which it is secured to the earth and the manner in which well bores are drilled through it.
Figure 16:
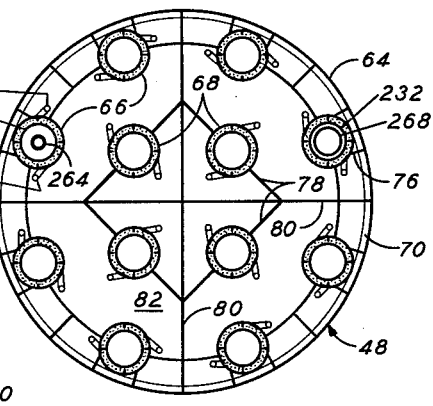
FIG. 16 is a plan view taken along the line 16—16 of FIG. 15.
Figure 17:
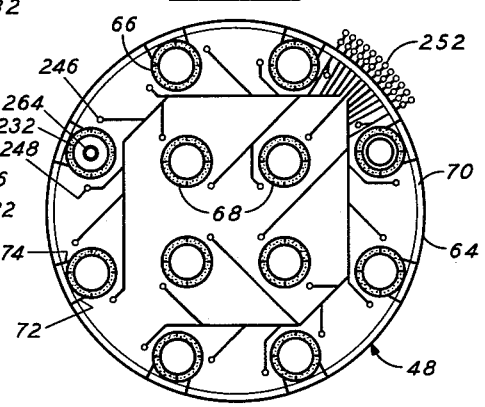
FIG. 17 is a plan view taken along the line 17—17 of FIG. 15.

Referring now to FIG. 1 in conjunction with FIGS. 15–17, each of the column members 48 and 50 is made with a cylindrical shell 64 of constant diameter throughout its length. A plurality of tubular guide casing elements are placed within each shell and are integrated with it as functional load-carrying elements of the column structure. In the embodiment of the invention illustrated, a first series of guide casing elements 66 are placed in uniformly spaced-apart relationship adjacent the inner circumferential surface of the shell. A second series of tubular guide casing elements 68 are symmetrically disposed about the longitudinal axis of the shell and at a lesser radial distance from this axis than the first series of guide casing elements. A plurality of flat ring elements 70 are affixed to the inner wall of the shell in longitudinally spaced relationship substantially throughout the length of the shell. These ring elements extend radially inwardly from the inner surface of the shell and into contact with the exterior surface of guide casing elements 66 of the first series. At each point where a ring element 70 contacts a guide casing element, a pair of flat plates 72 and 74, aligned with the longitudinal axis of the guide casing element and positioned with one on either side of it, is placed between and in contact with the wall of the shell and the outer wall of the respective guide casing. Each plate is made to extend a short distance above and below the corresponding flat ring, and in certain portions of the column, as at the top and bottom, where additional strength or rigidity is desired, the plate is made long enough to span the distance between several rings, as exemplified by the plate 76, FIG. 15. The plates are affixed to the inner wall of the shell and the respective flat ring element and guide conduit member to form a unitary structure. In this manner, the guide casing elements are incorporated as an essential portion of the column structure and permit the use of a lighter cylindrical shell than would be required if the latter was the main load-carrying member of the column and the guide casings performed only the guiding function. This construction permits the use of less weight of material in the column, while retaining the strength necessary for its function.

The inner series of guide casing elements 68 are connected together in the bottom portion of the column by plates 78 which are securely fixed to diametrically disposed plates 80. The latter plates extend to and are affixed to the inner wall of the shell 64 to thereby form a rigidly integrated structure which will transfer the load from the column to piles which subsequently will be secured to the lower portion of the guide casing elements.

The bottom ends of the column members 48 and 50 are closed in an airtight manner by a respective plate 82 which is concaved inwardly better to withstand the forces which will be placed on it during the time the column is being established on bottom and subsequent thereto, and the top ends of columns are closed in an airtight manner by a respective plate 84. The tubular guide casing elements extend through these closure members, and their exterior walls are sealed to the closure members in an airtight manner. A series of transverse partitions 86, 88 and 90, which are concave downwardly toward the base of the column, are placed within the shell of the column member and affixed to its inner wall and to the outer walls of the guide casing elements in an airtight manner. These partitions divide the column into a series of airtight chambers designated from the bottom of the column upwardly as 92, 94, 96 and 98, FIG. 1, into which water or air can be controllably introduced through appropriate lines by remote operation at the surface of the water to control the buoyancy of each chamber individually.

Figure 11:
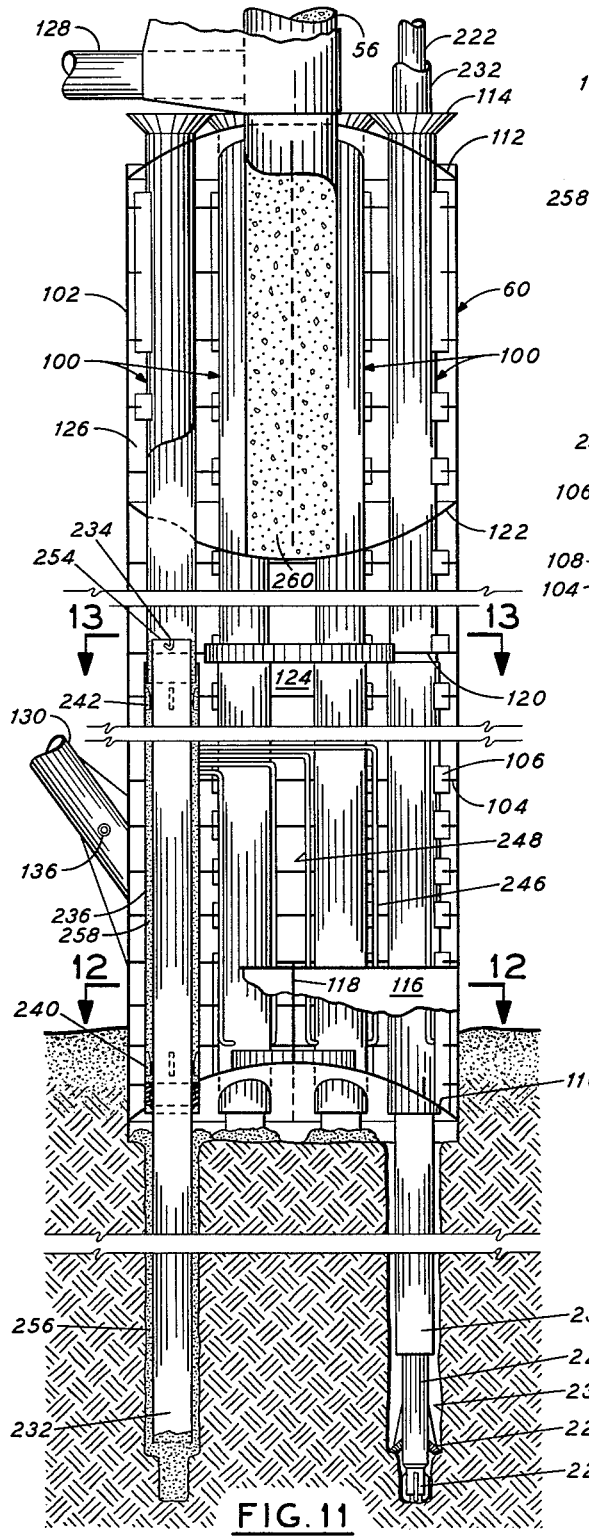
FIG. 11 is a view in elevation and partly in section of a pontoon section of a secondary supporting column member used in the support structure and illustrates in more detail the manner in which a column member is attached to the submerged earth.
Figure 12:
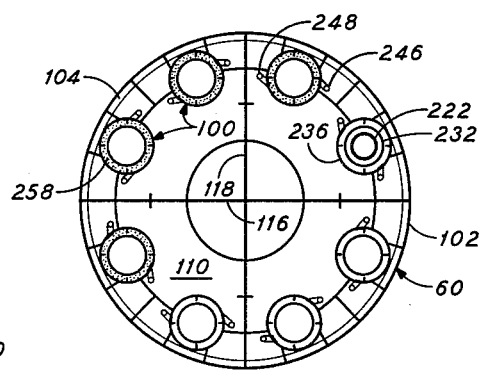
FIG. 12 is a plan view taken along the line 12—12 of FIG. 11.

Referring now to FIGS. 1, 2 and 11, the second pair 52 and 54 of the column members of the support structure are formed throughout the major portion of their length as cylindrical columns of appreciably less external diameter than the principal column members previously described. For example, for a structure for use in 165 feet of water and having the dimensions previously described, the upper approximately three-quarters of each of the second column members will have an external diameter of about four feet, while, as stated, the first two column members will have an external diameter of about 16 feet. The lower approximately one-quarter of each of the second column members, which is expanded in diameter to form the pontoon sections 60 and 62, respectively, will have an external diameter of approximately 14 feet for the structure exemplified herein.

The interior construction of each of the pontoon sections 60 and 62 is similar to that described for the principal supporting columns 48 and 50. Each pontoon section contains within it a plurality of uniformly spaced-apart guide conduits 100 which are distributed around its inner periphery and disposed with the open upper ends of the conduits placed radially exteriorly of the outer surfaces of the respective upper portions 56 and 58 of the column members. The guide conduits are structurally integrated with the shell 102 of the pontoon through the circumferential flat rings 104 and respective pair of flat plates 106 and 108 which are affixed to and between the inner surface of the shell and each guide conduit and to the respective flat ring 104 in the manner explained heretofore. The guide conduits extend through and are secured in an airtight manner to a concaved upwardly bottom closure member 110 and a concaved upwardly top closure member 112 for the pontoon section and terminate at their upper ends in respective funnels 114. These funnels serve to guide equipment, such as a drill string, or structural members, such as piling, into the guide conduit. The lower end portion of the pontoon section is reinforced by diametrically disposed plates 116 and 118 and by a horizontally disposed perforated plate 120. The construction described heretofore incorporates the guide conduits as structurally functional load-carrying members of the pontoon section and permits the weight of material in this section to be reduced considerably over what otherwise would be required to carry the loads imposed on it.

Each pontoon section 60 and 62 contains a respective transverse partition 122 which is secured to the inner wall of the shell 102 and to each of the guide conduits in an airtight manner to provide separate airtight chambers 124 and 126 within the pontoon section. These chambers are individually connected to remotely controlled air and water lines to provide buoyancy control of the pontoon sections from the surface of the water.

The upper portions, 56 and 58 of the respective support columns, extends into the upper end of the complementary pontoon section through the top closure member 112 to which it is affixed and is seated on and securely attached to transverse partition 122, which also forms a bottom closure member for it. Thus, both portions of these column members are connected together as unitary, single-column structures.

The four columns are connected together in spaced relationship by transverse and diagonal bracing members as represented by the members 128 and 130, FIG. 1. These members are tubular in form, and the trussing terminates below the surface of the water when the support structure is landed on the underwater bottom to reduce the effect on the structure of the surface forces of the water. The interconnecting members in the lower portion of the assemblage have holes through their walls as indicated at 132, 134 and 136, FIG. 1, to permit water to flood them when the support structure is lowered into position, to thereby increase its stability. The upper tiers of bracing members have valves, as 133 and 135, connected to them, which permits optional flooding of the associated bracing members in the upper portion of the support structure.

FIG. 1 illustrates schematically the arrangement by which the buoyancy of the various chambers in the column members is controlled individually. Thus a water valve 138 operated from the top of column member 26 by a line 140 is placed in the bottom portion of chamber 92. A conduit 142 connects this valve through the shell of the column member with the exterior thereof. An airline 144 from the top of the column member terminates within the upper portion of the chamber at 146. The valve 138, which may, for example, be hydraulically, pneumatically or electrically operated, is operated by remote control from the surface of the water to flood the chamber 92 to any desired degree, or while the valve 138 is open, air under pressure may be forced through the line 144 into the chamber to purge it of water. Correspondingly, the chamber 94 contains the remotely controlled water valve 148 and is connected to the airline 150, and the chamber 96 contains the remotely controlled water valve 152 and is connected to the airline 154. Each of the water valves and airlines may be operated independently of the other to provide control of the buoyancy of each chamber separately and independently of the condition of another chamber.

In a like manner, each of the chambers of each pontoon section of the column members 52 and 54 are provided with buoyancy control. Thus the water valve 156 and the airline 158 in the chamber 124 of pontoon section 60 and the water valve 160 and airline 162 connected in the upper chamber 126 of this pontoon section provide independent control of the buoyancy of these chambers. It will be understood, of course, that the valve 156 is operated from the surface of the water through the control line 164, and the valve 160 in the upper chamber has a corresponding control line 166 from the surface.

Preferably, during the erection procedure the control lines are brought together in a bundle at the top of the support structure and connected to a manifold on a service vessel, which contains the source of power for operating the valves and the air compressors for the airlines and from which the buoyancy of any of the various chambers of the assemblage can be controlled most expeditiously in accordance with the desired behavior of the structure as it is being maneuvered in the water.

FIG. 2 illustrates an assembled support structure constructed as described heretofore floating horizontally on the surface of the water and being towed to an offshore drilling site. In this condition, the chambers of the principal pontoon column members 48 and 50 and the chambers of the pontoon sections 60 and 62 of the second column members 52 and 54 are filled with air, and the second column members are supported above the pontoon column members and above the surface of the water.

The construction and arrangement of the component parts as described heretofore place the center of gravity of the assemblage well below the geometrical center.

Figure 18:
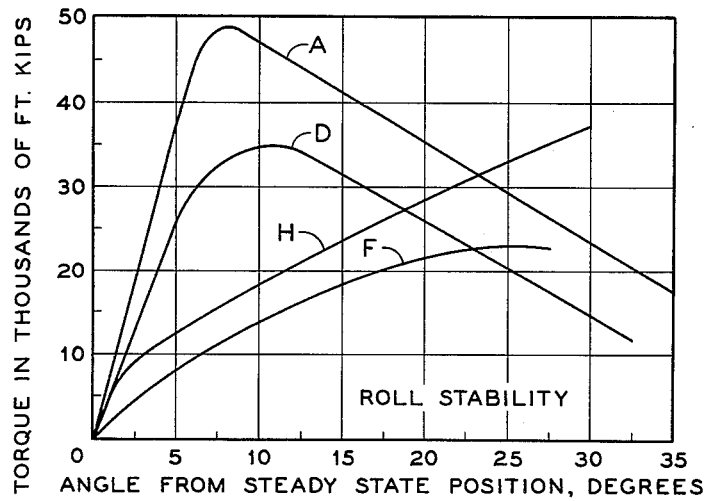
FIG. 18 is a graphic representation of the stability against roll of the support structure of FIG. 1 in various attitudes as it is being changed from a horizontal to a vertical position in the water.
Figure 19:
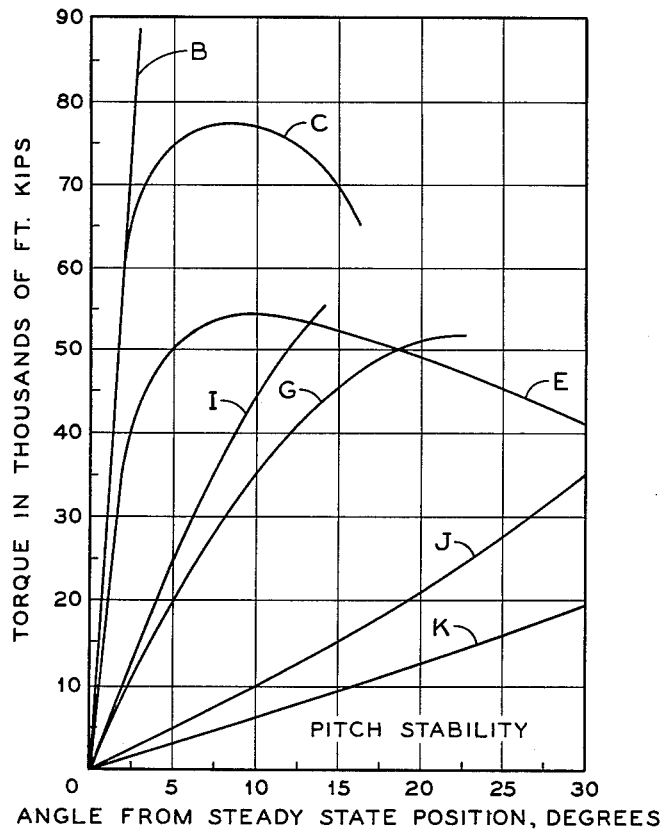
FIG. 19 is a graphic representation of the stability against pitching of the support structure of FIG. 1 in various attitudes as it is being changed from a horizontal to a vertical position in the water.

The stability of this structure against upsetting or overturning while being maneuvered in the water is indicated by the graphs of FIGS. 18 and 19. In these graphs the restoring force inherent in the assemblage is plotted in terms of net restoring moment for various angles of displacement from a steady-state position, and is indicated on the graphs in terms of torque in thousands of foot kips, wherein a kip is equal to one thousand pounds. Thus, with the structure in the steady-state, horizontal position indicated in FIG. 2, its stability against roll is indicated by the curve A of FIG. 18. It will be noted the restoring force builds up to approximately 48,000 foot kips when the assemblage rolls about 8° from the steady-state position. As the angle of roll is increased beyond this point, the inherent restoring force acting on the structure decreases uniformly. However, it will be noted that even when the assemblage is displaced 30° in roll from this steady-state position, the righting force acting on it is approximately 23,000 foot kips. The period of roll of the structure in normal towing position has been determined to be 6.5 seconds, which is less than the expected period for waves of any significant height. Thus, there is no danger of synchronously applied wave forces inducing a roll of aggravated amplitude.

FIG. 19 illustrates graphically the stability of the structure against pitching for various steady-state attitudes of it between the horizontal and the vertical. Curve B of the graph indicates the stability of the assemblage against forward pitching, by which is meant such pitching as would tend to submerge the top ends of the column members in the water, when the steady-state position of the assemblage is as indicated in FIG. 2. As shown by curve B, the restoring force rises rapidly and uniformly to approximately 88,000 foot kips as the angle of forward pitching increases to approximately 3° from the horizontal.

Curve C on the graph indicates the stability of the assemblage against aft pitching, by which is meant pitching in a direction to submerged the lower ends of the column members in the water. As indicated by the curve, the restoring force increases to approximately 77,000 foot kips as the structure is displaced approximately 9° from the steady-state position, and has a value of approximately 70,000 foot kips when the angle is 15°. The period of pitch has been determined to be approximately 5.0 seconds, which again is below the period of any large wave heights which can be expected, as is the period of heave, which has been determined to be 4.4 seconds.

It is apparent from the data presented above that the support structure is very stable in the water in its towing position, and can safely be towed through open water under normal conditions without danger of capsizing or upending.

The support structure is towed to an offshore drilling site by the tugs 168 and 170 and is connected there to a service boat from which the procedures can be carried out for rotating the structure to a vertical position in the water. The service boat may be a derrick barge 172 to which the support structure is connected by restraining lines 174 and 176 and by the bundle 178 of lines which control the buoyancy of the individual chambers in the support columns of the structure, as explained heretofore. The individual control lines in the bundle 178 are connected to appropriate valves in a manifold 180 on the barge, which contains also the power sources for actuating the flooding valves in the column chambers and the source of air under pressure for blowing out these chambers.

The derrick 182 of the derrick barge may be connected to the support structure by lifting lines, not shown, to provide additional control of its rotation during the up-ending procedure, and the barge is maneuvered in position by the tugs 184 and 186 to maintain an optimum relationship with the support structure as the latter is being manipulated in the water. Preferably, the tugs 168 and 170 remain connected to the support structure by restraining lines, at least during the initial phases of the upending procedure, and can be disposed as required to prevent the structure from being carried from the drilling site by wind forces and water currents.

Preferably the upending procedure begins with the partial flooding of the corresponding chambers 94 in the pontoon column members 48 and 50, rather than by flooding the lowermost chambers 92. When these chambers are half filled with water, the structure will be inclined at an angle of approximately 1.8° toward the lower ends of the column members. The rolling and pitching stability of the structure in this steady-state position is indicated by the curve D of FIG. 18 and the curve E of FIG. 19, respectively. As will be noted, the restoring force against roll reaches a peak of approximately 34,000 foot kips at 10° roll, and the restoring force against pitching reaches a peak of approximately 54,000 foot kips at 10° aft pitching angle from the steady-state position. The period of roll of the structure in this condition is approximately 5.0 seconds and that of pitch approximately 5.6 seconds. It is apparent that the support structure is quite stable in this steady-state position.

In the next stage of the upending procedure, the corresponding lower chambers 92 of the pontoon column legs 48 and 50 are gradually flooded until they are completely filled with water. When this has been accomplished, the support structure is inclined at an angle of approximately 32.8° from the horizontal with the lower ends of the principal pontoon column members completely immersed in the water, and the pontoon sections of the lower portions of the column members 52 and 54 each in contact with the water and acting as stabilizing pontoons to maintain the support structure in this steady-state position. The rolling and pitching stability of the structure in this condition are indicated by the curves F and G of FIGS. 18 and 19, respectively. As indicated, the restoring force against roll builds up substantially uniformly to a value of approximately 23,000 foot kips at 25° roll from the steady-state position, and the restoring force against aft pitching increases to a value of approximately 52,000 foot kips at an angle of approximately 22° from the steady-state position. The period of roll for this condition is approximately 18.4 seconds and that of pitch approximately 9.8 seconds.

In the next stage of the upending procedure, the corresponding chambers 94 have the remainder of their volumes filled with water, each chamber being filled at the same rate to maintain the pitching and rolling stability of the assemblage. When these corresponding compartments are completely filled with water, the support structure assemblage assumes the attitude illustrated in FIG. 4. In this position, the assemblage is inclined at an angle of approximately 32.3° from the horizontal toward the bottom ends of the column members. The added weight of water to the pontoon column members increases the draft of the assemblage and pulls the pontoon sections 60 and 62 of the respective column members 52 and 54 further into the water. However, these pontoon sections are not completely submerged in this position, and their buoyant force, together with the buoyant force of the empty upper chambers of the principal pontoon column members, maintain the assemblage in this steady-state position. The pontoon sections 60 and 62 are spaced apart from each other across the width of the assemblage to act as stabilizing pontoons which prevent uncontrolled roll or overturning of the structure in this partially submerged condition. The distribution of the component masses throughout the assemblage places the center of gravity well below the center of buoyancy. The period of roll for the assembled support structure in this condition is approximately 16.0 seconds and the period of pitch approximately 9.3 seconds.

Curve H of FIG. 18 indicates the roll stability of the structure for the condition described immediately heretofore. As shown, the restoring force increases to approximately 37,000 foot kips when the structure is displaced in roll 30° from its steady-state position. The pitch stability as indicated by the curve I in FIG. 19 increases to approximately 55,000 foot kips restoring force at an angle of approximately 13° from the steady-state position.

It will be noted that by the construction and arrangement of parts of the support structure of this invention the stability of the structure against uncontrolled movement, such as uncontrolled rolling or pitching or gyrations about a vertical axis, is maintained even when the principal column members are substantially submerged in the water, where their submerged weight is essentially less effective in balancing the weight of the other component masses which are not submerged. If the structure had been made with the component masses symmetrically distributed around and along the longitudinal axis of the structure, its position would be unstable when it was placed in the condition illustrated by FIG. 4, or the described condition immediately preceding that represented by FIG. 4, and would be susceptible to sudden, uncontrolled movements of great force in rolling or pitching or in a combined roll and pitch which would cause it to gyrate about a vertical axis. Such uncontrolled forces may be large enough to be destructive to the structure and hazardous to the men carrying out the upending operation of it. It will be noted from the graphs of FIGS. 18 and 19 that by the arrangement of this invention the stability of the structure in a steady-state position in the water is increased, rather than decreased, through this critical stage of the upending operation.

In the next stage of the upending procedure, the corresponding chambers 124 of the pontoon lower sections of the column members 52 and 54 are gradually flooded. This rotates the assemblage toward the vertical. As the pontoon sections 60 and 62 become submerged in the water, the empty chambers 96 and 98 in the upper portions of the principal pontoon column members 48 and 50 act as spaced-apart stabilizing pontoons to prevent the assemblage from rolling about its longitudinal axis as it assumes the vertical position.

The corresponding upper chambers 126 of the pontoon sections 60 and 62 are constructed with sufficient buoyant capacity to act with the slender column sections 56 and 58 to maintain the half of the assemblage of which they are a component part in a vertical floating position in the water when the corresponding lower chambers 124 are flooded. The upper corresponding chambers 96 and 98 of the principal pontoon columns supply the remainder of the buoyancy to keep the assembled structure in a vertical position in the manner illustrated in FIG. 5 of the drawings.

When the support structure is in the condition described immediately heretofore, it is floating in the water with the bottom ends of the column members out of contact with the submerged land surface. The stability of the structure in this condition is illustrated by the curves J and K of FIG. 19. The curve J indicates the restoring force generated against pitching as the structure tilts from the vertical in a direction parallel to a plane passing through a like pair of column members, which would be a plane perpendicular to the plane of the paper of FIG. 5. As indicated in the graph, the restoring force increases substantially uniformly to a value of approximately 35,000 foot kips when the structure is displaced 30° from a steady-state position. Curve K of the graph indicates the stability against pitching in the direction of a like pair of column members, that is, in the plane in the paper of FIG. 5. In this direction the restoring force increases substantially uniformly to a value of approximately 19,000 foot kips when the structure is displaced 30° from a steady-state position. With the assemblage in this steady-state position, the period of pitch is approximately 22.9 seconds in either direction, which is very insensitive to wave resonance.

After the support assemblage has been rotated to the vertical, it is towed to a position directly above the submerged well site and set on bottom. This is accomplished by flooding the corresponding upper chambers 126 of the respective pontoon sections of column members 52 and 54 and the corresponding chambers 96 of the principal pontoon column members 48 and 50 simultaneously to decrease the buoyancy of the assemblage and lower it into contact with the submerged land surface while maintaining its vertical position. This stage of the flooding procedure permits enough water to be added to the respective chambers to bring the structure into firm contact with the underwater bottom. Where the bottom is silty or sandy, as will be the usual case, the weight of the structure causes the lower ends of the column members to penetrate a short distance into the submerged land as illustrated in FIG. 6.

Referring now to FIG. 9, the top of each column member has affixed to it a means for detachably connecting a box girder which extends between the top of a principal pontoon column member and the adjacent slender column member. This connector comprises a bearing plate 188, on each side of which is an upwardly projecting element 190 through which are aligned holes 192 for receiving respective pins 194. The box girder 196 has a shoe 198 securely but detachably affixed to it, and the lower end of the shoe is formed as a curved bearing surface 200 designed to rest on the bearing plate 188. The lower portion of the shoe has a hole formed in it in alignment with the holes 192 of the elements 190 to receive the pin 194. The connection between the box girder and the tops of the column members is designed to permit the box girder to be disconnected from the column members by removing the respective pins 194, reversed end for end, and again connected to the tops of the column members in this reversed position by replacing the pins 194.

In the completed drilling platform, the box girders form the principal beam members which support the drilling deck and associated equipment. Each box girder may, for a structure of the dimensions mentioned heretofore, have a depth of approximately 10 feet and a width of approximately 8½ feet and its walls are connected together in a watertight manner to provide storage for fluid materials in the finished structure. The interior of the box girder is divided into watertight sections by partitions, one of which is indicated at 202 in FIG. 7. One end 204 of each of the box girders extends outwardly beyond the column which supports it. Ultimately these ends of the box girders will form a cantilevered support for the drilling deck which extends outwardly of the principal support columns 48 and 50 as shown in FIG. 1.

After the support structure is set on bottom as indicated in FIG. 6, the box girders 196 are used to level the tops of the columns. If, for example, the top of the column member 52 extends above the level of the other column members, a box girder is connected between this column member and the corresponding principal column member 48 with the cantilevered end portion 204 of the box girder connected to the column member 52. Water is then introduced through an appropriate conduit 206 into the end compartments 208 of the box girder until the added weight of the water acting on the column member 52 causes the bottom end of it to sink into the submerged earth until the top of this column member is level with that of the other column members. The water may then be drained from the end compartments through an appropriate valve 210 and the box girder disconnected from the tops of the column members, lifted by the derrick barge and reversed into its normal position, and reconnected in its final position to the support structure. Likewise, if the top of a principal pontoon column member extends above the level of the other column members, the box girder may be connected in its final operative position between the column members in the manner illustrated in FIG. 8 and the appropriate end portion of it filled with sufficient water to cause the column member to sink into the submerged earth until the top of it is level with that of the other columns. For small adjustments to the level of one of the slender column members 52 and 54 sufficient weight may be obtained by filling the end compartments 212 with water while the box girder is in its normal position. The valve 213 permits these compartments to be drained.

If one box girder cannot provide sufficient weight to cause a misaligned column member to sink the desired amount, then the second box girder is placed directly on top of and in alignment with the first box girder connected between the columns, after removing the shoe pieces 198 from the second box girder, and the appropriate compartments of the first and second box girders filled with water to add sufficient weight to force the misaligned column into the submerged land. The ability to use structural components of the drilling platform in this manner to level the supporting structure at an offshore location not only has economic advantages but enables the structure to be erected in a shorter time, an important consideration when working in open waters.

When the platform supporting structure has been levelled, and before the platform is assembled on it, the structure is secured to the submerged land by piles which are cemented to the support structure and to the earth and will hold the structure in a level position under the additional load of the drilling platform and equipment.

FIGS. 10 and 11 illustrate a procedure for setting the piles in a support structure installed in deep water. The box girders 196 are secured to the top ends of their corresponding support columns and a lightweight rotary drilling rig 214 and 216, respectively, is set on the top of each box girder and in alignment with a corresponding support column. Power for operating the drilling rigs is supplied from the service barge 172 through the lines 218 and 220.

Tubular piling is used for this installation and the piling may be heavy casing pipe. A drill string 222 with a drill bit 224 having extendible and contractible side cutters 226 on it is lowered from the drilling rig 216 through a guide casing 66 or 68 over which the rotary table is centered, in the case of a principal pontoon column member, and through a guiding hole in the guide collar 228 and the aligned guide conduit 100 of the lower pontoon section 60 or 62 in the case of a secondary column member and a bore hole 230 of sufficient diameter to receive the pile 232 is drilled below the column member. In formations where there is danger of the walls of the bore hole expanding or slipping into the well bore, the piling 232 is lowered on a pile follower, to which it is detachably connected as by a bayonet connection or J slot 234, to follow the drill bit into the hole. When the hole has been drilled to the desired depth, the side cutters of the drill bit are retracted and the drill string withdrawn through the pile and pile follower, leaving the pile within the bore hole.

Figure 14:
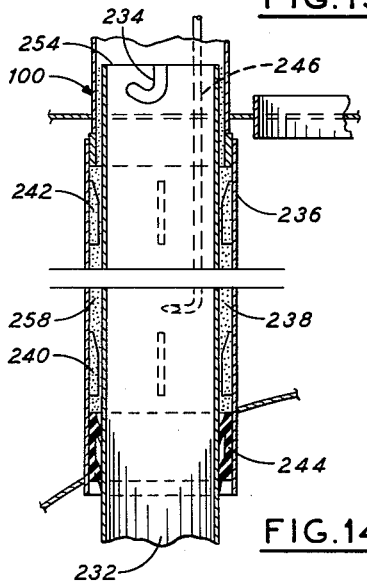
FIG. 14 is a view in sectional elevation of a detail of the lower portion of a guide tube of the pontoon section illustrated in FIG. 11 with a pile cemented in it.

FIGS. 11 and 14 illustrate the detail of the construction of the lower portion of a representative guide element, both for the principal pontoon column members and for the pontoon lower sections of the second column members, and show the relationship thereto of a pile in its operating position. The lower portion of the guide element 100 is made with a lower tubular section 236 of increased internal diameter to increase the annular space 238 between the outer wall of the pile 232 and the inner wall of the guide element. A circumferential ring of symmetrically disposed guiding lugs 240 is affixed to and projects inwardly from the expanded tubular section 236 adjacent its lower end, and a second ring of such guiding lugs is affixed adjacent its upper end, as at 242, to guide the pile into axial alignment with the lower portion of the guide element as the pile is lowered into the bore hole and to maintain this coaxial alignment after the pile is lowered to its operating position. A resilient sealing means 244 which may be made of rubber or a rubber-like material is secured within the lower end of the guide element and projects inwardly into contact with the circumference of the pile to seal the lower end of the annular space 238 in a fluid-tight manner.

Each of the expanded tubular lower sections 236 of the guide elements have two diametrically oppositely disposed cement pipes 246 and 248 for example, connected to it in a position above the annular sealing means 244. The cement pipes communicate with the annular space 238 through a respective conduit which is formed through the wall of the guide element.

Figure 13:
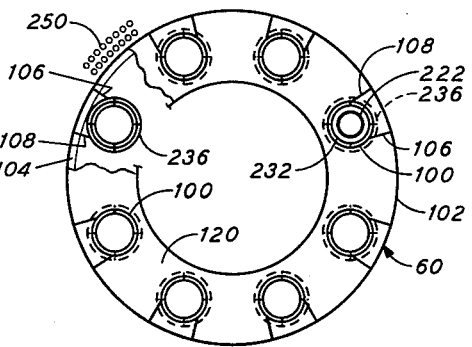
FIG. 13 is a plan view taken along the line 13—13 of FIG. 11.

The respective pair of cement pipes for each of the guide casing elements of the principal pontoon columns and for each of the tubular guide elements of the lower pontoon sections of the secondary columns are assembled in the support structure when it is fabricated. These cement pipes are gathered into bundles as illustrated at 250 FIG. 13 and 252 FIG. 17 and the bundles are continued upwardly along the length of their respective columns to the top ends thereof. Thus a pair of cement pipes associated with a particular guide element may be connected to cementing apparatus at the surface of the water and the cement forced downwardly into the lower ends of the guide members to cement the respective piles to them.

After the bore hole 230 has been drilled below a column member to receive a pile, the pile is lowered on a detachably connected pile follower through the guide member, and the guide collar 228 in the case of the secondary support columns, and into the bore hole until the top of the pile 232 is just above the lower expanded tubular section 236 of the guide member and within the portion of reduced section, as indicated at 254 in FIG. 14. The pile is then cemented to the earth by a cementing material 256 which is forced out of the lower open end of the pile and into the annular space between the outer wall of the pile and the wall of the bore hole in a manner analogous to that employed for cementing well casing in a well bore.

When this cement is set, the pile follower is detached from the upper end of the pile and withdrawn from the guide element. A measured amount of cementing material is then forced downwardly through the appropriate cement pipes 246 and 248 associated with a particular guide element and the annular space 238 between the pile and the guide element is completely filled with cement 258 from the sealing means 244, which prevents the cement from flowing out of the lower end of the annular space, to the top 254 of the pile within the reduced section of the guide element. The guiding lugs 240 and 242 maintain a uniform annular space between the pile and the guide element and assure that the complementary surfaces of these members will be out of contact with each other and exposed throughout their full circumferences to the cement so that the proper bond and strength will be developed between the cement and these associated portions of the structure to transmit the loads imposed on the support structure into the earth without the supporting structure sinking or settling or moving from its fixed position.

In some locations, especially in shallower waters and where the character of the submerged land permits, it may be desirable from the standpoint of economy to use driven piles rather than preparing a bore hole to receive the piles in the manner explained heretofore. The technique of driving piles in an offshore location by pile drivers or hammers of various sorts is well developed and need not be amplified here for the purposes of this invention.

After the supporting structure is secured in place by piles in the manner explained heretofore, the interiors of the slender sections 56 and 58 of the respective support columns 52 and 54 may be filled with cement 260 from the closed lower portion at the transverse wall 122 to substantially its upper end, as indicated in FIG. 11. The cement serves to strengthen the column member and makes it better able to resist damage through the impact of waterborne objects which may be forced against it. Additionally, the added weight of the cement increases the stability of the structure.

The box girders 196 are connected across the respective support columns in their final positions. The drilling platform 20 is erected on top of the box girders and the derrick 30 draw works and other pertinent apparatus is assembled in place. The major portions of the drilling platform and other equipment are fabricated on land, lightered to the drilling site, and lifted to the top of the support structure by the derrick barge 172 for final assembly. Preferably the derrick 30 is skid mounted and a similar derrick 30 is placed over each of the principal column members 48 and 50. The oil wells 262 are drilled by drilling tools, as drill string 264 and drill bit 266, guided downwardly through the guide members 66 and through the respective tubular piles 232 cemented to the guide members and into contact with the submarine earth formations as illustrated in FIG. 15.

The tubular pile and guide member form an extension of the well bore to the elevation of the drilling platform and permit the use of well control equipment, such as blowout preventers and drilling heads, in a location above the surface of the water where they are readily available for maintenance and repair. Also, this arrangement enables casing strings 268 to be landed in the well bore and cemented thereto and other well-working operations to be carried out in a manner analogous to that employed in well-drilling operations on land.

It will be appreciated that the majority of well bores drilled from this offshore structure will be deviated from the vertical by whipstocking or other known means to cover the entire area of oil-bearing formation around the drilling site. The capacity of this offshore drilling platform for drilling a greater number of oil wells than is permitted by the number of guide members in the principal support columns is increased by constructing tiers of aligned casing guides 270 on the transverse members 272, 274, and 276, which extend between and are connected to the principal support columns prior to the time the support structure is placed in the water. When the drilling platform is completed, the derricks 30 and associated operating equipment are skidded or moved along the platform into vertical alignment with a set of casing guides 270. A string of conductor casing is lowered through the aligned guides and its bottom end affixed to the submerged land. The conductor casing serves both as a guide for the well-drilling and well-working tools and as an extension of the submerged well bore to the elevation of the drilling platform in a manner similar to the guide members 66 described heretofore.

It is possible to move this structure from its fixed position and establish it at another offshore drilling site by removing the drilling deck and equipment and box girders from the top of the supporting structure and severing the piles below the bottoms of the support columns by shaped charges or a cutting tool. The structure may be refloated either in a vertical position off bottom or in a horizontal position at the surface of the water by opening the flooding valves in the water-filled chambers of the pontoon column members and the pontoon sections of the second column members and blowing the water from these chambers by compressed air.

For short moves in the range of several miles, it is most expeditious to remove only sufficient water from the buoyancy chambers to float the structure off bottom in a balanced, vertical position and then tow it in this vertical position to the new drill site. The structure is again established on bottom by reflooding the buoyancy chambers and setting new piles to secure it to the underwater bottom.

Figure 20:
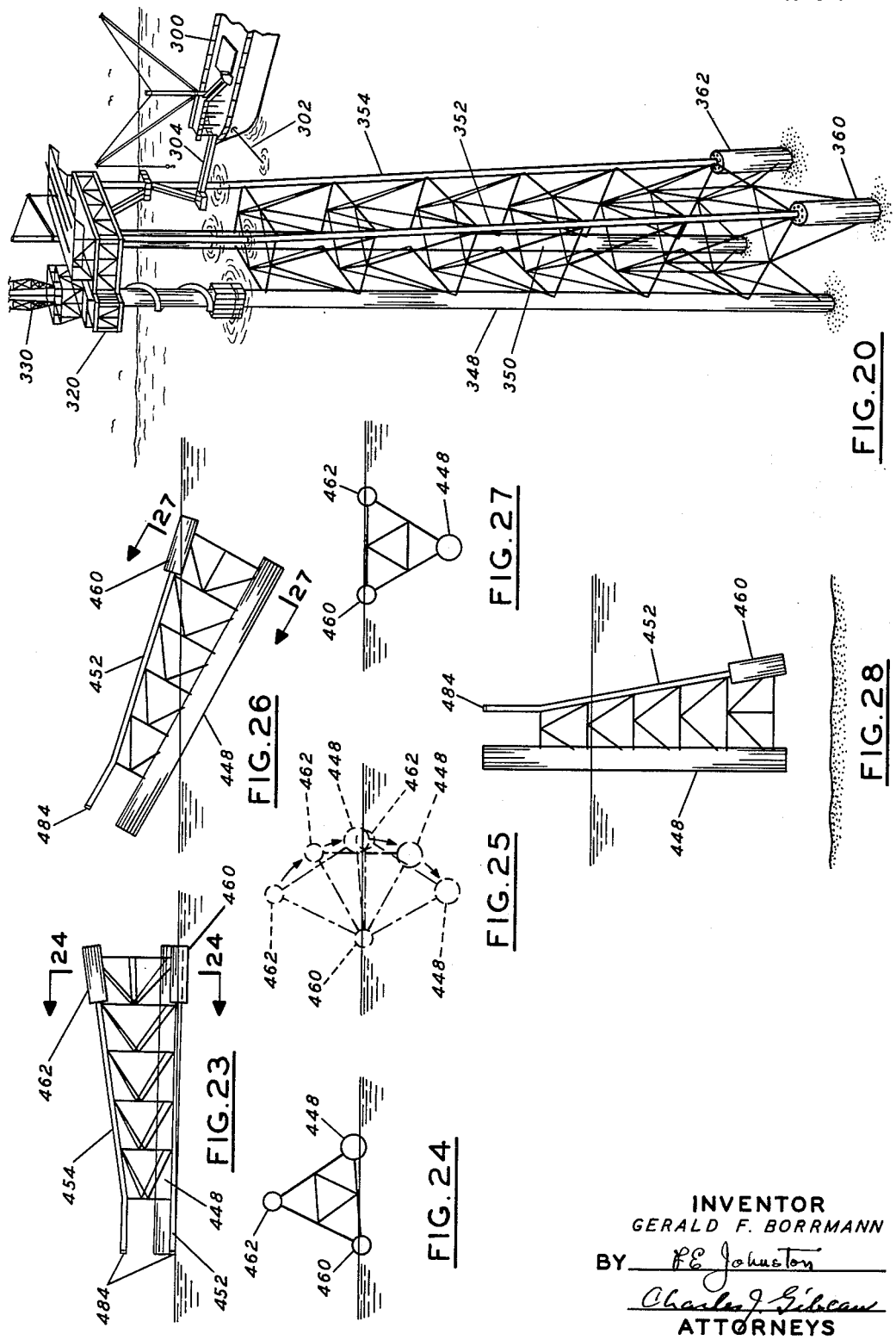
FIG. 20 illustrates in elevational perspective view the features of the support structure of FIG. 1 as applied to a tender operated offshore drilling and production platform.

FIG. 20 illustrates the features of the support structure of FIG. 1 applied to a support structure for a tender-operated offshore drilling and production platform. As is understood in the art, such a platform is used in conjunction with a drilling tender which latter carries much of the weighty and bulky supplies, material and equipment required for performing a rotary drilling operation as well as providing quarters for the drilling crew. The tender is anchored close to the platform and connected to it by a gangway, power and supply lines, and supplies the platform as necessary as the drilling operation proceeds.

In such a system, it is not necessary to make the platform with the area or load-carrying ability required for a self-contained drilling platform, and hence the components of the support structure for the tender-operated platform will be proportioned differently from corresponding components of the heavier structure.

The platform illustrated in FIG. 20 is designed for use in a water depth of 300 feet with the bottom of the lowermost deck set at 60 feet above mean low water to clear a 60 foot wave. Allowing for 15 feet of penetration of the bottom of the support columns into the soft underwater bottom, the length of the vertical principal support legs 348 and 350, which correspond to the support legs 48 and 50 of FIGS. 1 and 2, will be 375 feet and they will have a diameter of 16 feet. The secondary support legs, 352 and 354, which correspond to the legs 52 and 54 of the previous figures, will have pontoon lower portions 16 feet in diameter and approximately 53 feet long while the slimmer upper portions of the leg will have a diameter of 4 feet.

The similar legs of a pair are spaced 75 feet apart while the respective pairs of legs are spaced 80 feet apart at the bottom end of the support structure, similarly to the spacings of the legs of the previously described support structure.

The secondary support legs of the support structure shown in FIG. 20 are battered, or inclined upwardly toward the principal column members to accommodate the smaller platform area required while retaining for this structure the stabilizing effect of appropriately-spaced secondary pontoons while the structure is being set upright in the water in the manner described heretofore. The spread at the bottom of the support structure also is designed to provide increased stability against the effects of wind and water forces when the platform is fixed to a deep underwater bottom.

The support structure is fixed at the offshore site by piles which are drilled or driven into the underwater bottom through guide casings or conduits built into the respective components of the structure, in the manner illustrated in FIGS. 11 to 15, to which piles the support structure, after leveling, is cemented.

After the support structure is fixed in place, a deck 320 is secured to the top of it and a derrick 330 is adjustably mounted on the deck so it can be placed over each of several guide casings incorporated in the structure of the principal column members, or in alignment with casing guide means placed between the column members in the manner described heretofore in relation to the support structure shown in FIG. 1 and sequence.

A tender 300 is anchored close to the offshore platform as by anchor lines 302 and may be connected to it by a gangway 304. Means are provided for transporting material and supplies from the tender to the platform to keep the loading on the platform at a minimum, as is well understood in the art.

A platform of the type shown in FIG. 20 may be used as a production platform either initially or after the drilling of the wells have been completed. As will be understood in the art, the constant attendance of the tender 300 at the platform is not needed when the platform is put to this use. When used as a production platform, the support structure of the present invention has the advantage that the watertight chambers built into its principal column members can be used to store the produced oil between trips of the tankers which take the oil from the platform. A support structure with the proportions indicated in FIG. 20 will provide storage in its legs for 20,000 to 30,000 barrels of oil.

In situations where an oil deposit is more efficiently developed by a number of widely-spaced wells which may be drilled and completed individually from a floating drilling vessel, the principles illustrated in the platform of FIG. 20 can be applied to a relatively light duty gathering platform to which production lines from the individual wells are brought for processing and storing the oil, and from which platform the individual wells can be controlled by remote operation.

FIG. 21 illustrates the concept of this invention as applied to an offshore platform which does not require the load carrying ability of the modifications previously described or from which only a relatively few number of wells is intended to be drilled. For well drilling purposes this platform is constructed as a tender operated platform from which a well drilling operation will be conducted in conjunction with a tender anchored close to it in the manner of the platform illustrated in FIG. 20.

A platform of the type illustrated in FIG. 21 may be used as a drilling platform to develop a relatively shallow oil deposit where only a small number of wells can be deviated economically from the platform location to cover the surrounding portion of the oil field. The load carrying and platform space requirements for such a drilling schedule is less than that required for the platforms previously described. Hence the support structure for the platform can be designed to effect a considerable saving in the cost of material and construction while retaining the advantageous features of controlled stability while it is being towed horizontally to the offshore site, rotated to a vertical position in the water, and fixed to the underwater bottom.

The embodiment of the invention illustrated in FIGS. 21 and 22 employs three columnar support members 448, 452 and 454 secured together by cross bracing and disposed in a triangular pattern as shown in FIG. 22. The leg 448 is the principal support member and corresponds in construction and function with the legs 48 and 50 of the first described embodiment of the invention. The legs 452 and 454 are secondary support members and correspond in construction and function to the pair of legs 52 and 54 previously described. These legs therefore include pontoon portions 460 and 462 respectively as their lower ends.

As in the modification illustrated in FIG. 20 the secondary legs of the structure shown in FIG. 21 are inclined upwardly toward the principal columnar member to accommodate a platform 420 of smaller area than the platforms discussed heretofore.

The principal support member 448 is constructed as an elongated watertight pontoon which can be divided into separate chambers 492 and 498 inclusive by transverse partitions 486, 488, and 490 in the same manner as and for the same purpose as the comparable support columns 48 and 50 described heretofore, and in like manner each chamber is connected to an air line and a remotely controlled flooding valve, as represented by the air line 444 and the flooding valve 438 operated by the control line 440 associated with chamber 492. Likewise, the pontoon lower section 460 and 462 of the respective secondary support members 452 and 454 may be divided by a respective transverse partition 422 into upper and lower chambers, 426 and 424, the buoyancy of each of which can be controlled independently by an air line and flooding valve associated with it in a manner indicated for the corresponding pontoon section 60 of FIG. 1.

Figure 4:
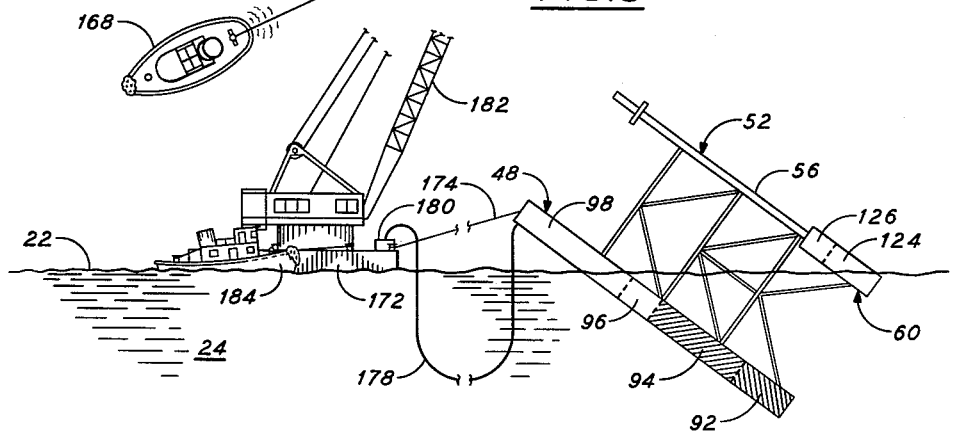

The air and valve operating lines for controlling the buoyancy of the pontoon chambers of the principal and secondary support legs are carried to the top of the support structure and connected to a manifold on a service vessel, as indicated in FIG. 4, from which the buoyancy of any of the various chambers of the assemblage can be controlled selectively and in combination to produce the desired behavior of the structure as it is being maneuvered in the water.

FIG. 23 schematically illustrates the support structure of FIG. 21 floating horizontally on the surface of the water while it is being towed to an offshore site. In this condition the chambers of the principal pontoon column member 448 and the chambers of the pontoon sections 460 and 462 of the secondary column members are filled with air and the top ends of the secondary column members 452 and 454 are capped with a watertight closure, as at 484, to trap air in the upper portion of them so that they will be buoyant in the water.

When the structure is lying horizontally on the surface of the water the principal column member 448 functions as the principal pontoon means to support the assemblage in this position. The secondary column member 352 also is in contact with the water and the lower pontoon section 360 thereof together with the corresponding air filled upper section provide ample buoyancy in cooperation with the principal pontoon member to float the assemblage in the horizontal position. The secondary column member 354 is held above the other two and above the surface of the water by the cross bracing which interconnects the legs. FIG. 24 is an elevational end view of the support structure floating in this horizontal position and shows the disposition relative to the surface of the water and to each other of the principal pontoon member 448 and the pontoon lower sections 460 and 462 of the secondary support members.

When the support structure has been towed to the drilling site, the compressed air lines and flooding valve control lines are conected to the service vessel and the lower chambers of the principal column member 448 are flooded with water while the pontoon lower section 460 of support leg 352 remains filled with air. The lower end of leg 448 begins to summerge and the assembled support structure assumes an inclined position with the pontoon lower portion 460 of lag 452 remaining at the surface of the water. As the flooding of leg 448 continues and more of it becomes submerged, the assemblage pivots about the horizontally-disposed axis passing through the pontoon section 460 while the pontoon section 462 of upper leg 454 approaches the surface of the water. The changes of position of the structure during this manuever is illustrated schematically in FIG. 25.

By constructing the assemblage with a relatively heavy principal suport leg and lighterweight secondary support legs, the center of gravity of it is placed closer to the principal support leg than to the geometric axis of the triangle formed by the legs. The center of gravity therefore remains below the metacenter as the flooding of leg 448 progresses and the stability of the assemblage against aggravated rolling or pitching is retained. The flooding of leg 448 continues until the pontoon lower portion 462 of leg 454 is in contact with the water, as illustrated in FIG. 27. The pontoon portions 460 and 462 now function as spaced-apart stabilizing pontoons which, together with the buoyant upper portion of leg 448, hold the structure in an inclined position in the water in a stable steady-state condition, as illustrated in FIG. 26.

It will be noted that both the stabilizing effects of the spaced-apart pontoon portions 460 and 462 and the less massive construction of the upper portions of secondary support legs 452 and 454 relative to the principal support member 448 give the assemblage good stability in this position against rolling or pitching or uncontrolled gyrations. If, for instance, all three legs of the support structure were constructed similarly in weight and the center of gravity of it was initially on its geometric axis, the center of gravity would move upwardly relative to the axis of symmetry and toward the air-supported legs while the third leg became submerged in water and its effective weight was decreased. For such a construction the stability of the assemblage would decrease as it became inclined in the water, and as it approached a vertical position it would be prone to gyrate in an uncontrolled manner about a vertical axis to reach an unpredictable steady-state position.

Referring again to FIG. 26, after the pontoon sections 460 and 462 are both in contact with the water and a predetermined angle of inclination for the assemblage has been reached, the lower chambers of pontoon sections 460 and 462 are flooded to rotate the structure toward a vertical position. As the flooding of sections 460 and 462 continues, they become submerged and the structure assumes a vertical position in the water. In this position the buoyancy of the upper portions of legs 452 and 454, together with the residual buoyancy of their pontoon lower portions 460 and 462, cooperate with the buoyancy of the upper portion of the principal leg 448 to maintain the structure in a stable, vertical floating position. The center of gravity remains below the metacenter. The less buoyant upper portions of legs 452 and 454, relative to the buoyancy of the upper portion of leg 448, will prevent a passing wave from producing the same buoyant force upon each leg as the water rises around it and thus will avoid an induced oscillation in roll synchronous with the period of the wave.

After the support structure has been rotated to a vertical position, the pontoon chambers of the leg members are flooded an additional amount to lower it into contact with the underwater bottom.

After leveling, the support structure is secured to the underwater bottom by piles in the manner described heretofore. Pile guides 428 are fixed at intervals along the lengths of the upper portion of legs 452 and 454 and in alignment with respective funnels 414 which communicate with guide conduits built into the pontoon sections 460 and 462 in the manner illustrated in FIG. 11. The guides hold the piles 432 in alignment with the angle of the secondary leg member as the piles are being drilled or driven into the underwater bottom. The principal column member also is secured in place by piles inserted through guide casing elements built into this column member in the manner illustrated in FIG. 15. As explained heretofore, tubular piles are used for this purpose and an oil well is drilled by tools lowered downwardly from the platform and guided by the guide casing and the tubular piles associated therewith and into contact with the submarine earth formations.

When it is desired to drill more wells than can be accommodated by the number of guide casings 466 built into the principal leg, tiers of aligned casing guides 470 are secured peripherally to the exterior of this leg and are employed in the manner of the corresponding casing guides 270 described in relation to FIG. 10. For well drilling purposes, a derrick and associated equipment, not shown, are mounted on the platform 420 and used in conjunction with a tender, not shown, which is connected to the platform by the gangway 404 and such power and supply lines as are required to integrate the operations of the platform and the tender, as described with relation to FIG. 20.

When a multiplicity of wells are to be drilled from the platform illustrated in FIG. 21, a skid-mounted derrick as described with relation to FIG. 1 may be used. A known type of derrick which is provided with a crown block which can be moved relative to the derrick structure and into vertical alignment with several guide casings while the derrick remains in a set position can be used to advantage.

The use of the platform illustrated in FIG. 21 as a gathering or production platform will be comparable to the previously described similar use of the platform illustrated in FIG. 20.

For a support structure constructed in the arrangement illustrated in FIGS. 21 and 22 for use in a water depth of 215 feet, with a deck clearance of 54 feet above mean low water and allowing for 9 feet of penetration of the lower end of the column members into the soft mud of the underwater bottom, the vertical principal support leg will be 278 feet long and 20 feet in external diameter. Each of the pontoon lower sections of the secondary support legs will be 50 feet long and have an external diameter of 14 feet, while the upper longitudinal portions of these legs will have an external diameter of 3 feet. The bottom ends of the pontoon lower portions of the secondary legs will be spaced apart 92 feet on center and the transverse distance between the center of the principal support leg and the line joining the centers of the bottoms of the secondary leg pontoons will be 73 feet. The pontoon lower portions of the secondary legs thus are spaced a sufficient distance from each other and from the lower end of the principal leg adequately to function as stabilizing pontoons as the support structure is rotated from a floating horizontal to a vertical position in the water, as described heretofore.

As with the previously decribed embodiments of this invention, the structure illustrated in FIG. 21 can be moved to a new location by removing its deck load, severing the piles which connect it to the underwater bottom, selectively blowing the water out of the various buoyancy chambers by compressed air and refloating the structure either in a vertical or a horizontal position, towing it to the new site and reestablishing it on the underwater bottom.

From the foregoing description of several embodiments of this invention, it is apparent that it provides a marine structure which can be fabricated and assembled in its major portions at a land base and, because of the inherent stability built into it through a particular distribution of masses and buoyancy effects, towed long distances to an offshore site, rotated from a horizontal to a vertical position in the water, and established on the underwater bottom. The particular construction of the assemblage and the manner in which portions of it are made to function as stabilizing pontoons while avoiding a symmetrical balancing of the masses around a geometric axis enables the upending procedure to be made rapidly and under positive control and without the hazard of it accidentally generating destructive forces through uncontrolled movements.

It is apparent that other modifications than those described herein may be made to the support structure of this invention without departing from the inventive concept. Therefore, it is intended that the invention embrace all equivalents within the scope of the appended claims.

I claim:

1. A support structure for an offshore platform wherein said structure is designed to be floated horizontally on the surface of a body of water and then rotated in said water to a vertical position by flooding the lower portion of said structure and then set vertically on the underwater bottom, comprising a support structure having a plurality of columnar support members affixed together in complementary spaced relationship by cross bracing and disposed in a substantially symmetrical pattern about the geometric longitudinal axis of said structure, adjacent ones of some of said members having less weight than the remainder of said members to thereby displace the center of gravity of said structure substantially closer to one side thereof than the distance from said one side of said geometric axis, controllably buoyant sections within and along the length of said remainder of said members, said adjacent ones of said members having a respective upper column portion and a lower column portion, the length of said lower portion being substantially less than the overall length of a said member, the said upper portion of said adjacent ones of said members being buoyant and having less buoyancy in the water than the buoyancy of the corresponding upper portion of a respective said remainder of said members, the said lower portion of said adjacent ones of said members being controllably buoyant pontoon column sections of greater buoyancy in the water than the complementary said upper portion thereof, and means for controlling selectively and in combination the buoyancy of said controllably buoyant sections.

2. A support structure in accordance with claim 1 comprising three columnar support members affixed together by cross bracing and disposed in a triangular pattern, two of said members having less weight than the remaining member to thereby displace the center of gravity of said structure closer to said remaining member than the distance therefrom of the center of said triangular pattern, controllably buoyant sections within and along the length of said remaining member, said two of said members having a respective upper column portion and a lower column portion, the length of said lower portion being substantially less than the overall length of a said member, said upper portion being buoyant and having less buoyancy in water than the buoyancy in water of the corresponding upper portion of said remaining member, the said lower portion of said two of said members being a controllably buoyant pontoon column section of greater buoyancy in the water than the complementary said upper portion thereof, and means for controlling selectively and in combination the buoyancy of said controllably buoyant sections.

3. A support structure in accordance with claim 1 comprising four columnar support members affixed together by cross bracing and disposed in a rectangular pattern, two adjacent ones of said members disposed as a first pair of members, said first pair of members having less weight than the remaining pair of said members to thereby displace the center of gravity of said structure substantially closer to said remaining pair than to said first pair, respective controllably buoyant sections within and along the length of each said member of said remaining pair, each said member of said first pair having a respective upper column portion and a lower column portion, the length of said lower portion being substantially less than the overall length of said member, said upper portion being buoyant and having less buoyancy in water than the buoyancy in water of the corresponding upper portion of a member of said remaining pair, the said lower portion of each of said members of said first pair being a respective controllably buoyant pontoon column section of greater buoyancy in the water than the complementary said upper portion thereof, and means for controlling selectively and in combination the buoyancy of said controllably buoyant sections.

4. A support structure for an offshore platform, said support structure comprising a plurality of columnar support members secured rigidly together in transversely spaced relationship to each other by cross bracing, at least one of said members forming a principal support member and constructed as an elongated watertight pontoon of controllable buoyancy to function as a principal pontoon means to float said structure horizontally on the surface of a body of water, at least a second of said support members having an upper portion and a lower portion with the length of said lower portion being substantially less than the overall length of said second member and with said second member constructed throughout the said upper portion thereof as a column portion of less weight per unit length than the corresponding upper portion of said principal support member to thereby place the center of gravity of said structure closer to said principal support member than to said second support member, said second support member constructed to have less buoyancy in water in the said upper portion thereof than the buoyancy in water of the corresponding upper portion of said principal support member and constructed in the said lower portion thereof as a watertight column portion of expanded cross section to form a controllably buoyant secondary pontoon means, said second support member being located in said structure to be held above said surface of said water by said cross bracing when said structure is in the horizontal floating position, means to introduce water into the lower end portion of said principal support member to rotate said structure in said body of water from said horizontal floating position to a floating position inclined to the vertical and with said secondary pontoon means in contact with said body of water, said secondary pontoon means having sufficient buoyant capacity to function as a stabilizing pontoon to hold said structure in a steady state in said inclined position, means to introduce water into said secondary pontoon means in an amount to rotate said structure to a vertical floating position wherein said secondary pontoon means is submerged in said body of water and said upper portion of said second support member extends upwardly through said body of water and above said surface thereof, and means to introduce additional amounts of water into said secondary pontoon means and said principal pontoon means to lower said structure vertically through said body of water and into contact with the underwater bottom with the respective upper portion of said columnar support members extending upwardly through said body of water to support a platform above said surface.

5. A support structure in accordance with claim 4 comprising four columnar support members secured rigidly together in transversely spaced relationship to each other by cross bracing, two adjacent ones of said support members constructed as a pair of principal support members and the remaining two of said four support members constructed as a pair of second support members, said structure constructed to float horizontally on the surface of a body of water with said pair of principal support members in contact with said water and said pair of second support members supported by said cross bracing above the surface of said water and with the center of gravity of said structure closer to said pair of principal support members than to said pair of second support members, means to introduce water into the lower end portion of each of said principal support members substantially simultaneously to rotate said structure in said body of water from a horizontal floating position to a floating position inclined to the vertical and with the lower end of said secondary pontoon means of said pair of second support members each in contact with said body of water and forming a pair of spaced-apart stabilizing pontoons to hold said structure in a steady state in said inclined position, means to introduce water into the said secondary pontoon means of said pair of second support members substantially simultaneously to rotate said structure to a vertical floating position, and means to introduce additional water into the pontoon portions of said principal support members and said second support members substantially simultaneously to lower said structure vertically through said body of water and into contact with the underwater bottom with the respective upper end portion of said four columnar support members extending upwardly through said body of water to support a platform above said surface.

6. A support structure in accordance with claim 4 comprising three columnar support members secured rigidly together in transversely spaced relationship to each other by cross bracing and disposed in a triangular configuration, one of said members constructed as a principal support member and as a principal pontoon means, the remaining two of said three support members constructed as a pair of second support members each having a respective secondary pontoon means as the lower end portion thereof and each having the respective upper portion thereof constructed as a column portion of less weight per unit length and less buoyancy in water than the corresponding upper portion of said principal support member, said structure constructed to float substantially horizontally on the surface of a body of water while supported by said principal pontoon means and the buoyancy of one of said second support members in contact with said water and with the other said second support member supported by said cross bracing above said surface, means to introduce water into the lower end portion of said principal pontoon means to rotate said structure in said body of water from a horizontal floating position to a floating position inclined to the vertical and with the lower end of said secondary pontoon means of said pair of second support members each in contact with said body of water and forming a pair of spaced-apart stabilizing pontoons to hold said structure in a steady state in said inclined position, means to introduce water into the said secondary pontoon means of said pair of second support members substantially simultaneously to rotate said structure to a vertical floating position, and means to introduce additional water into said secondary pontoon means and said principal pontoon means substantially simultaneously to lower said structure vertically through said body of water and into contact with the underwater bottom with said columnar support members extending upwardly through said body of water to support a platform above said surface.

7. A support structure for an offshore platform, said support structure comprising four columnar support members secured rigidly together in transversely spaced relationship by cross bracing and disposed as two pairs of said members, a first pair of said members constructed as elongated watertight pontoons to float said support structure on the surface of a body of water with the second pair of said members supported above said first pair and above said surface of said water by said cross bracing, the said members of said second pair having a respective upper longitudinal column portion and a lower longitudinal column portion with the length of said lower portion being substantially less than the overall length of a member of said second pair, the said members of said second pair constructed with less weight than the said members of said first pair to thereby place the center of gravity of said structure substantially closer to said first pair than to said second pair, the said members of said second pair constructed in the said upper longitudinal portion of the column to have less buoyancy in water than the corresponding upper portion of said members of said first pair and constructed in the said lower longitudinal portion of said column as a respective pontoon section of greater buoyancy in water than the respective complementary said upper longitudinal portion thereof, respective partitions in said members of said first pair and in said pontoon sections of said members of said second pair forming separate watertight chambers therein, and means to introduce water and air into said chambers selectively and in combination to displace said structure in said body of water from a horizontal floating position to a vertical position with the bottom of said structure in contact with the underwater bottom and with said columnar support members extending upwardly through said body of water to support a platform above said surface.

8. A support structure in accordance with claim 7 wherein said two pairs of said members are secured together in spaced parallel relationship, and wherein the said members of said second pair are constructed with a smaller transverse dimension throughout the said upper longitudinal portion thereof thereby to have less buoyancy in water than the said corresponding upper portion of said members of said first pair, and wherein the said lower longitudinal portion of each of said members of said second pair is constructed with a greater transverse dimension than that of the said respective complementary upper portion thereof thereby to have greater buoyancy in water than said complementary upper portion.

9. A support structure for an offshore platform, said support structure comprising four columnar support members secured rigidly together in transversely spaced relationship by cross bracing and disposed as two pairs of said members, a first pair of said members constructed as elongated watertight pontoons of sufficient buoyancy to float said support structure on the surface of a body of water in a horizontal position with the second pair of said members supported above said first pair and above the said surface of said water by said cross bracing, the said members of said second pair having a respective upper longitudinal column portion and a lower longitudinal column portion with the length of said lower portion being substantially less than the overall length of a member of said second pair, the said members of said second pair constructed with less weight than the said members of said first pair to thereby place the center of gravity of said structure closer to said first pair than to said second pair, the said members of said second pair constructed in the said upper longitudinal portion thereof to have less buoyancy in water than the corresponding upper portion of said members of said first pair and constructed in the said lower longitudinal portion thereof with an increased transverse dimension to form a respective watertight pontoon section, respective partitions in said members of said first pair and in said pontoon section of said members of said second pair forming separate watertight chambers therein, and means to controllably flood and dewater said chambers selectively and in combination to rotate said structure in said water from a horizontal floating position to a position inclined to the vertical and with each said pontoon section of said second pair of members in contact with said water and functioning together as a pair of spaced-apart stabilizing pontoons to hold said structure in a steady state in said inclined position, said means being operable to displace said structure to a vertical position in said water and in contact with the underwater bottom with said columnar support members extending upwardly through said water to support a platform above said surface.

10. A support structure for an offshore platform, said support structure comprising four elongated column members spaced in parallel relationship and interconnected in pairs in a substantially rectangular form by cross bracing between them to form a rigid structure, a first pair of said column members constructed as similar elongated pontoon elements of sufficient buoyancy to support said structure in a horizontal floating position on the surface of a body of water with the second pair of said column members positioned above said first pair, said members of said second pair having a respective upper longitudinal column portion and a lower longitudinal column portion, the length of said lower portion being substantially less than the overall length of a member of said second pair, each of said column members of said second pair formed with the transverse dimension throughout the said upper longitudinal portion thereof substantially less than the transverse dimension of one of said column members of said first pair and with the average weight per unit length of a said upper longitudinal portion substantially less than the average weight per unit length of a column member of said first pair, a respective similar enlarged pontoon portion forming the said lower longitudinal portion of each of said column members of said second pair, respective partitions similarly dividing each of said column members of said first pair into separate chambers located in sequential relationship along the length of each thereof, respective partitions similarly dividing each of said pontoon portions of said column members of said second pair into a top and a bottom separate chamber, and means to controllably flood and dewater each of said chambers independently in said column members of said first pair and in said pontoon portions of said column members of said second pair.

11. A structure for supporting an offshore platform wherein said structure is an elongated support which is designed to be secured at its lower end to the earth submerged under a body of water and extend vertically through the water to a position above the surface thereof to support the offshore platform and wherein said structure is assembled as a unit on land and floated in a horizontal position on the surface of the water to an offshore site where it is then rotated to a vertical position and set on bottom, said structure comprising four platform support legs connected rigidly together in pairs in parallel spaced relationship by cross bracing, a first pair of said support legs constructed as cylindrical pontoons of substantially constant external diameter from the respective lower end to the respective upper end thereof and of sufficient buoyant capacity to support said structure in a horizontal floating position on the surface of the water with the second pair of said support legs positioned above said first pair and above the surface of said water, a respective plurality of tubular members within and extending continuously longitudinally through each of said legs of said first pair from the top end to the bottom end thereof, a plurality of respective transverse partitions within and sealed in airtight relationship to the inner walls of said legs of said first pair and the outer walls of the respective tubular members within said legs of said first pair and separating the interiors of each of said legs of said first pair into a series of airtight compartments extending sequentially from the lower portion to the upper portion thereof, remotely controlled means for introducing water into each of said compartments separately, each of said legs of said second pair having an upper portion and a lower portion, the length of said lower portion being substantially less than the overall length of a said leg, the said legs of said second pair constructed as columns of substantially less average weight per unit length and of substantially less external diameter than said legs of said first pair throughout the said upper portion of said second pair in the location of said second pair which will be in the zone of wave forces on said legs when said structure is established in a vertical position at an offshore location, said lower portion being of increased diameter in each leg of said second pair and forming respective submersible pontoon elements, respective top and bottom closure members secured in airtight relationship to each said pontoon element, a respective transverse partition within each said pontoon element dividing said pontoon element into airtight compartments, a respective plurality of open-ended continuous tubular members within and extending longitudinally through each said pontoon element and secured in an airtight manner to the respective top and bottom closure members thereof and to said transverse partition within each said pontoon element, said open-ended continuous tubular members being placed in spaced relationship around the inner periphery of the respective said pontoon element with the open upper ends of said tubular members placed radially exteriorly of the respective outer walls of said upper portions of said legs of said second pair, remotely controlled means to introduce water into each compartment of each said pontoon element separately, said pontoon elements of said second pair of legs being assembled in said structure as spaced-apart stabilizing pontoons with sufficient buoyant capacity to act wtih the said cylindrical pontoons formed by said legs of said first pair to control the attitude of said structure in predetermined steady state positions during the displacement of said structure from a horizontal to a vertical position and to support in a vertical position in the water the portion of said structure which includes said second pair of legs.

12. A support structure for an offshore platform wherein said support structure is fabricated on land and towed in a horizontal position to an offshore site where it is upended and landed on the underwater bottom to extend vertically through the water and support a stationary platform above the surface of the water, said support structure comprising four elongated column members secured together in pairs in spaced parallel relationship by cross bracing and disposed in plan view substantially at the corners of a rectangle, a first pair of said column members constructed as similar cylindrical pontoons of sufficient buoyancy to float said structure in a horizontal position on the surface of a body of water with the second pair of said column members disposed above said first pair, respective transverse partitions within said column members of said first pair dividing the respective lengths of said column members of said first pair into separate chambers, said column members of said second pair having a respective upper longitudinal column portion and a lower longitudinal column portion, the length of said lower portion being substantially less than the length of a said column member, said column members of said second pair constructed with substantially less weight per unit length and with less buoyancy in water throughout the said upper longitudinal portion thereof than said column members of said first pair, the assemblage of said four elongated column members and the said cross bracing interconnecting them being constructed to produce a non-symmetrical distribution of weight about the longitudinal axis of said assemblage and to place the center of gravity thereof closer to said first pair of column members than to said second pair, the said lower portions of said column members of said second pair formed as pontoon sections of greater buoyancy in water than the complementary said upper portion thereof, means to controllably inject and release water and air into and out of the said chambers of said first pair of column members and the said pontoon sections of said second pair of column members independently and selectively to displace said assemblage from a floating horizontal position on said surface of said body of water to a floating position in said body of water inclined to the vertical and subsequently to displace said assemblage from said floating position inclined to the vertical to a vertical floating position and to controllably further inject water into said first pair of column members and said pontoon sections of said second pair of column members to decrease the buoyancy of said assemblage and place the bottom end thereof in contact with the land surface submerged under said body of water.

13. An elongated support structure for an offshore platform wherein said support structure is fabricated on land and towed with its longitudinal axis in a horizontally disposed position to an offshore site where it is upended and landed on the underwater bottom to extend vertically through the water and support a stationary platform above the surface of the water, said support structure comprising four elongated column members secured together in pairs in spaced parallel relationship by cross bracing, a first two adjacent ones of said column members constructed as a first pair of similar cylindrical pontoons of sufficient buoyancy to float said structure in a horizontal position on the surface of a body of water with the other two column members of said four column members disposed as a second pair above said first pair, respective transverse partitions within said column members of said first pair dividing the lengths of said column members of said first pair into separate chambers extending sequentially from the lower end to the upper end thereof, said column members of said second pair having a respective upper longitudinal column portion and a lower longitudinal column portion, the length of said lower portion being substantially less than the length of a said column member, said column members of said second pair constructed with substantially less weight per unit length and with less buoyancy in water throughout the said upper longitudinal portion thereof than said column members of said first pair, the assemblage of said column members and the said cross bracing interconnecting them being constructed to produce a non-symmetrical distribution of weight about the longitudinal axis of said assemblage and place the center of gravity thereof substantially on a plane located between said column members of said first pair and perpendicular to the plane passing through said column members of said first pair and with said center of gravity located closer to said first pair of column members than to said second pair of column members, the said lower portions of said column members of said second pair formed as pontoon sections of greater buoyancy in water than the complementary said upper portion thereof, means to controllably inject water into the said chambers adjacent the lower ends of said first pair of column members to displace said assemblage from a horizontal floating position to a position inclined to the vertical and with said pontoon sections of said second pair of column members in contact with said body of water and cooperating with the buoyant upper chambers of said first pair of column members to support said assemblage in said inclined position, means to controllably inject water into said pontoon sections to displace said assemblage to a vertical position in said body of water, and means to inject water into selected upper chambers of said first pair of column members while injecting additional water into said pontoon sections to sink said assemblage in a vertical position through said body of water and into contact with the submerged land surface.

14. An offshore drilling structure comprising four vertically positioned columns secured rigidly together in parallel spaced relationship and disposed in pairs in a rectangular configuration and extending from a land surface submerged under a body of water to a position above the surface of said water, a drilling platform supported by said columns above the surface of said water, a first two adjacent ones of said columns forming a first pair with each column thereof having a substantially uniform cylindrical form throughout the longitudinal extent thereof, cylindrical guide members located within and extending longitudinally through each said column of said first pair and comprising means for guiding a drill string and drill bit from said drilling platform to the submerged land, respective closure members in the top and bottom end portions of each of said columns of said first pair and secured in a watertight manner to said columns and to the exterior surfaces of said guide members, respective partitions within each said columns of said first pair and secured in a watertight manner to the inner walls of said columns and the outer walls of said cylindrical guide members within said columns to form separate watertight chambers along the lengths of each of said columns of said first pair, controlled means to introduce water and air into each of said chambers separately, a second two adjacent ones of said columns forming a second pair, said columns of said second pair having a respective upper portion and a lower portion, the length of said lower portion being substantially less than the length of a said column, each column of said second pair having a uniform cylindrical form throughout the said upper portion thereof of substantially less diameter and substantially less buoyancy in water than that of a column of said first pair, a respective enlarged cylindrical pontoon forming the said lower portion of each of said columns of said second pair, a respective partition within each said pontoon lower portion dividing said pontoon lower portion into separate upper and lower chambers, controllable means to introduce water and air into each of said chambers separately of each said pontoon lower portion, said columns of said first pair being constructed with sufficient buoyant capacity to support said structure in a horizontal floating position on the surface of said body of water when the said chambers in said columns of said first pair and in said pontoon lower portions of said columns of said second pair contain air, said pontoon lower portions of said columns of said second pair being constructed with sufficient buoyant capacity to support said structure in a steady state position inclined to the vertical at the surface of said body of water when the lowermost of said chambers of said columns of said first pair are filled with water to submerge the lower end portions of said columns of said first pair within said body of water, said pontoon lower portions of said columns of said second pair constructed to act with the air filled uppermost chambers of said columns of said first pair to support said structure in said body of water in a semi-submerged vertical position when said lowermost of said chambers in said columns of said first pair and the lowermost of said chambers in said pontoon lower portions of said columns of said second pair are filled with water.

References Cited by the Examiner

UNITED STATES PATENTS

| | | | |
|---|---|---|---|
| 2,552,899 | 5/51 | Manes | 61—46.5 |
| 2,586,966 | 2/52 | Kuss et al. | 61—46 |
| 2,857,744 | 10/58 | Swiger et al. | 61—46.5 |
| 2,946,566 | 7/60 | Samuelson | 61—46.5 X |

OTHER REFERENCES

Construction Methods and Equipment (publication) August 1957, pp. 61–64.

EARL J. WITMER, *Primary Examiner.*

JACOB SHAPIRO, *Examiner.*

UNITED STATES PATENT OFFICE
CERTIFICATE OF CORRECTION

Patent No. 3,209,544　　　　　　　　　　　　　　October 5, 1965

Gerald F. Borrmann

It is hereby certified that error appears in the above numbered patent requiring correction and that the said Letters Patent should read as corrected below.

Column 2, line 66, for "to" read -- the --; column 3, line 32, for "accordane" read -- accordance --; column 4, line 44, for "strucutre" read -- structure --; line 64, for "becomes" read -- become --; line 69, for "condtions" read -- conditions --; column 5, line 10, for "strucutre" read -- structure --; column 6, line 75, for "portions" read -- portion --; column 8, line 42, for "submerged" read -- submerge --; column 15, line 58, for "11 to 15" read -- 11 and 15 --; column 16, line 1, for "have" read -- has --; column 17, line 6, for "strructure" read -- structure --; line 41, for "conected" read -- connected --; line 45, for "summerge" read -- submerge --; line 47, for "lag" read -- leg --; line 56, for "suport" read -- support --; column 24, line 41, for "of" read -- on --.

Signed and sealed this 28th day of June 1966.

(SEAL)
Attest:

ERNEST W. SWIDER　　　　　　　　　　　　　EDWARD J. BRENNER
Attesting Officer　　　　　　　　　　　　Commissioner of Patents